US011636521B2

(12) United States Patent
Pan et al.

(10) Patent No.: US 11,636,521 B2
(45) Date of Patent: *Apr. 25, 2023

(54) PRUNING FOR CONTENT SELECTION

(71) Applicant: Verizon Media Inc., New York, NY (US)

(72) Inventors: Junwei Pan, Sunnyvale, CA (US); Tian Zhou, Sunnyvale, CA (US); Aaron Eliasib Flores, Menlo Park, CA (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,938

(22) Filed: Mar. 9, 2022

(65) Prior Publication Data
US 2022/0198526 A1    Jun. 23, 2022

Related U.S. Application Data

(63) Continuation of application No. 17/028,183, filed on Sep. 22, 2020, now Pat. No. 11,295,346.

(51) Int. Cl.
*G06Q 30/02*       (2012.01)
*G06Q 30/0273*    (2023.01)
*G06N 3/082*       (2023.01)
*G06N 20/00*       (2019.01)

(52) U.S. Cl.
CPC ......... *G06Q 30/0275* (2013.01); *G06N 3/082* (2013.01); *G06N 20/00* (2019.01)

(58) Field of Classification Search
CPC ..... G06Q 30/0275; G06N 20/00; G06N 3/082
See application file for complete search history.

(56) References Cited

U.S. PATENT DOCUMENTS

| | | | |
|---|---|---|---|
| 6,907,566 B1 * | 6/2005 | McElfresh | G06Q 30/0255 705/14.69 |
| 7,043,462 B2 * | 5/2006 | Jin | G06N 3/126 706/13 |
| 7,050,868 B1 * | 5/2006 | Graepel | G06Q 10/06 700/91 |
| 7,158,959 B1 * | 1/2007 | Chickering | G06Q 30/0269 725/35 |

(Continued)

*Primary Examiner* — Michael I Ezewoko
(74) *Attorney, Agent, or Firm* — Cooper Legal Group LLC

(57) ABSTRACT

One or more computing devices, systems, and/or methods are provided. A machine learning model may be trained using a plurality of sets of information. One or more pruning operations may be performed in association with the training to generate a machine learning model with sparse vector representations associated with features of the plurality of sets of information. A request for content associated with a client device may be received. A set of features associated with the request for content may be determined. A plurality of positive signal probabilities associated with a plurality of content items may be determined using the machine learning model based upon one or more sparse vector representations, of the machine learning model, associated with the set of features. A content item may be selected from the plurality of content items for presentation via the client device based upon the plurality of positive signal probabilities.

20 Claims, 17 Drawing Sheets

(56) References Cited

U.S. PATENT DOCUMENTS

| | | | |
|---|---|---|---|
| 7,774,227 B2* | 8/2010 | Srivastava | G06Q 30/0205 |
| | | | 705/7.34 |
| 8,417,650 B2* | 4/2013 | Graepel | G06Q 10/00 |
| | | | 706/12 |
| 2019/0114677 A1* | 4/2019 | Xie | G06N 20/20 |

* cited by examiner

400 ⟶

```
┌─────────────────────────────────────────────────────────────────────┐
│         DETERMINE, USING FIRST MACHINE LEARNING MODEL, PLURALITY OF │
│  CLICK PROBABILITIES ASSOCIATED WITH PLURALITY OF CONTENT ITEMS BASED│
│  UPON ONE OR MORE FIRST SPARSE VECTOR REPRESENTATIONS, OF FIRST     │
│  MACHINE LEARNING MODEL, ASSOCIATED WITH SECOND SET OF FEATURES,    │──── 414
│  WHEREIN FIRST CLICK PROBABILITY OF PLURALITY OF CLICK PROBABILITIES IS│
│  ASSOCIATED WITH SECOND CONTENT ITEM OF PLURALITY OF CONTENT ITEMS  │
│  AND CORRESPONDS TO PROBABILITY OF RECEIVING SELECTION OF SECOND    │
│  CONTENT ITEM RESPONSIVE TO PRESENTING SECOND CONTENT ITEM VIA      │
│  SECOND CLIENT DEVICE                                               │
└─────────────────────────────────────────────────────────────────────┘
                                    │
                                    ▼
┌─────────────────────────────────────────────────────────────────────┐
│   SELECT, FROM PLURALITY OF CONTENT ITEMS, SECOND CONTENT ITEM      │
│  FOR PRESENTATION VIA SECOND CLIENT DEVICE BASED UPON PLURALITY OF  │──── 416
│                         CLICK PROBABILITIES                         │
└─────────────────────────────────────────────────────────────────────┘
                                    │
                                    ▼
┌─────────────────────────────────────────────────────────────────────┐
│   SUBMIT SECOND BID VALUE ASSOCIATED WITH SECOND CONTENT ITEM TO    │
│ SECOND AUCTION MODULE FOR PARTICIPATION IN SECOND AUCTION ASSOCIATED│──── 418
│                    WITH SECOND REQUEST FOR CONTENT                  │
└─────────────────────────────────────────────────────────────────────┘
```

FIG. 4B

PRUNING FOR CONTENT SELECTION

RELATED APPLICATION

This application claims priority to and is a continuation of U.S. application Ser. No. 17/028,183, filed on Sep. 22, 2020, entitled "PRUNING FOR CONTENT SELECTION", which is incorporated by reference herein in its entirety.

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company.

SUMMARY

In accordance with the present disclosure, one or more computing devices and/or methods are provided. In an example, a first bid request may be received. The first bid request is associated with a first request for content associated with a first client device. The first bid request is indicative of a first set of features comprising one or more first features associated with the first request for content. A first bid value associated with a first content item may be submitted to a first auction module for participation in a first auction associated with the first request for content. A first set of auction information associated with the first auction may be stored in an auction information database. The first set of auction information is indicative of the first set of features. The auction information database comprises a plurality of sets of auction information, comprising the first set of auction information, associated with a plurality of auctions comprising the first auction. A machine learning model may be trained using the plurality of sets of auction information. One or more pruning operations may be performed in association with the training to generate a first machine learning model with sparse vector representations associated with features of the plurality of sets of auction information. A second bid request may be received. The second bid request is associated with a second request for content associated with a second client device. The second bid request is indicative of a second set of features comprising one or more second features associated with the second request for content. A plurality of click probabilities associated with a plurality of content items may be determined using the first machine learning model based upon one or more first sparse vector representations, of the first machine learning model, associated with the second set of features. A first click probability of the plurality of click probabilities is associated with a second content item of the plurality of content items and corresponds to a probability of receiving a selection of the second content item responsive to presenting the second content item via the second client device. The second content item may be selected from the plurality of content items for presentation via the second client device based upon the plurality of click probabilities. A second bid value associated with the second content item may be submitted to a second auction module for participation in a second auction associated with the second request for content.

In an example, a first request for content associated with a first client device may be received. A first set of features associated with the first request for content may be determined based upon the first request for content. A first content item may be selected for presentation via the first client device. A first set of information associated with the first request for content may be stored in an information database. The first set of information is indicative of the first set of features. The information database comprises a plurality of sets of information, comprising the first set of information, associated with a plurality of requests for content comprising the first request for content. A machine learning model may be trained using the plurality of sets of information. One or more pruning operations may be performed in association with the training to generate a first machine learning model with sparse vector representations associated with features of the plurality of sets of information. A second request for content associated with a second client device may be received. A second set of features associated with the second request for content may be determined based upon the second request for content. A plurality of positive signal probabilities associated with a plurality of content items may be determined using the first machine learning model based upon one or more first sparse vector representations, of the first machine learning model, associated with the second set of features. A first positive signal probability of the plurality of positive signal probabilities is associated with a second content item of the plurality of content items and corresponds to a probability of receiving a positive signal responsive to presenting the second content item via the second client device. The second content item may be selected from the plurality of content items for presentation via the second client device based upon the plurality of positive signal probabilities. The second content item may be transmitted to the second client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4B is a second portion of a flow chart illustrating an example method for determining click probabilities associated with content items and/or selecting content for presentation to users.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
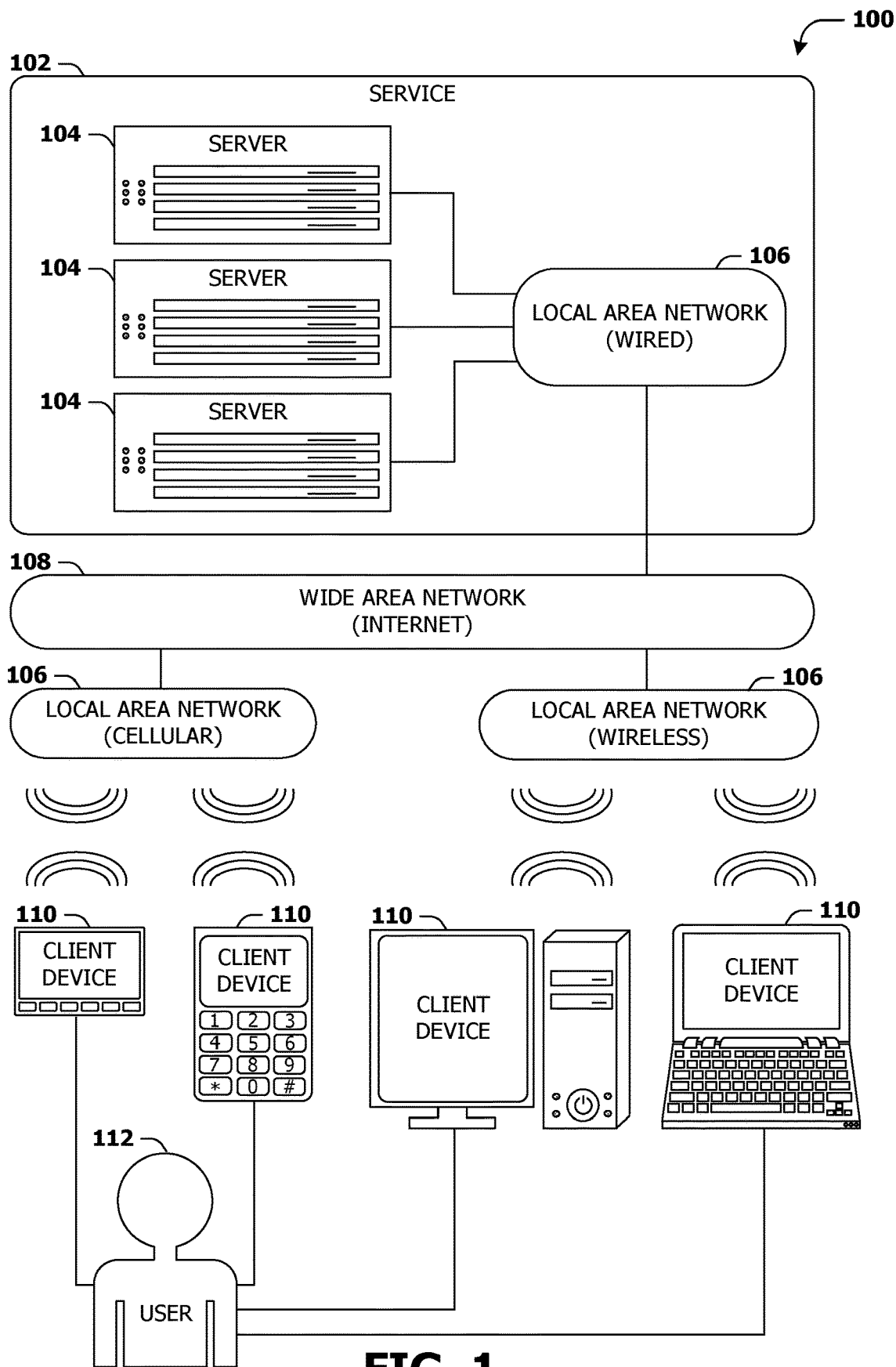
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
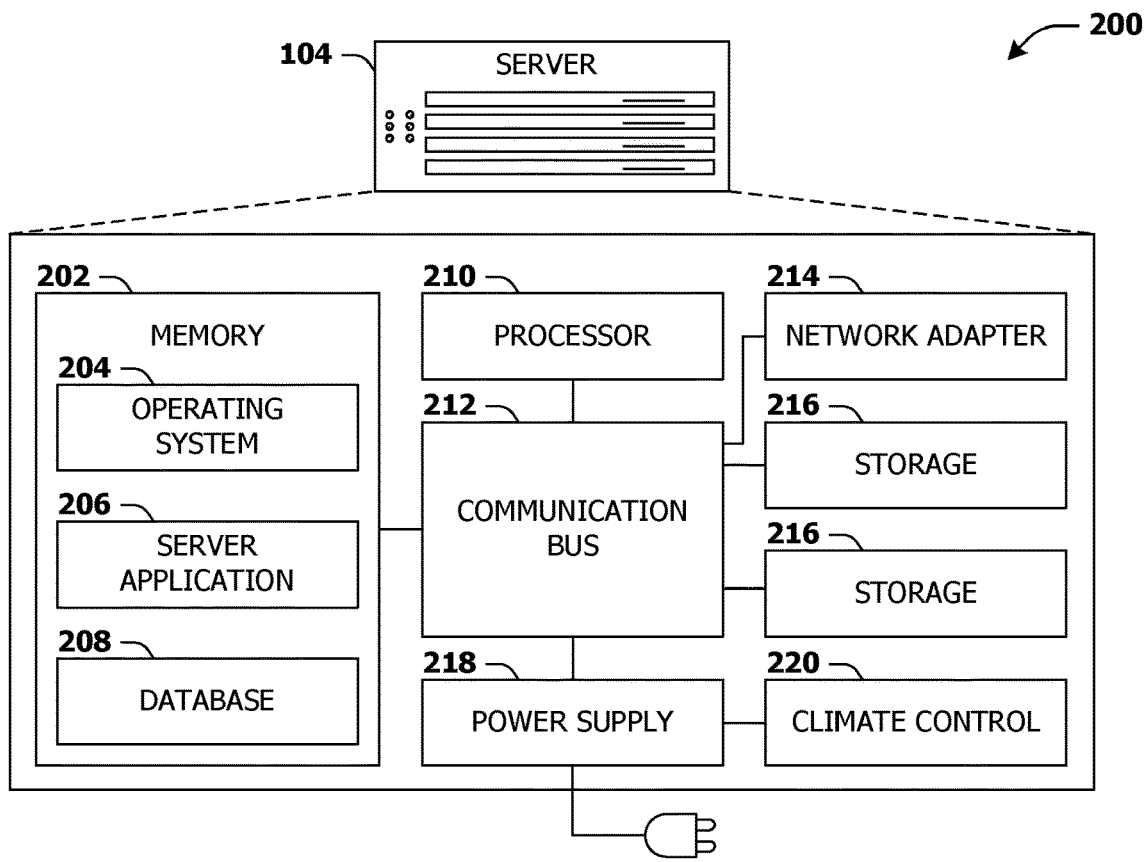
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
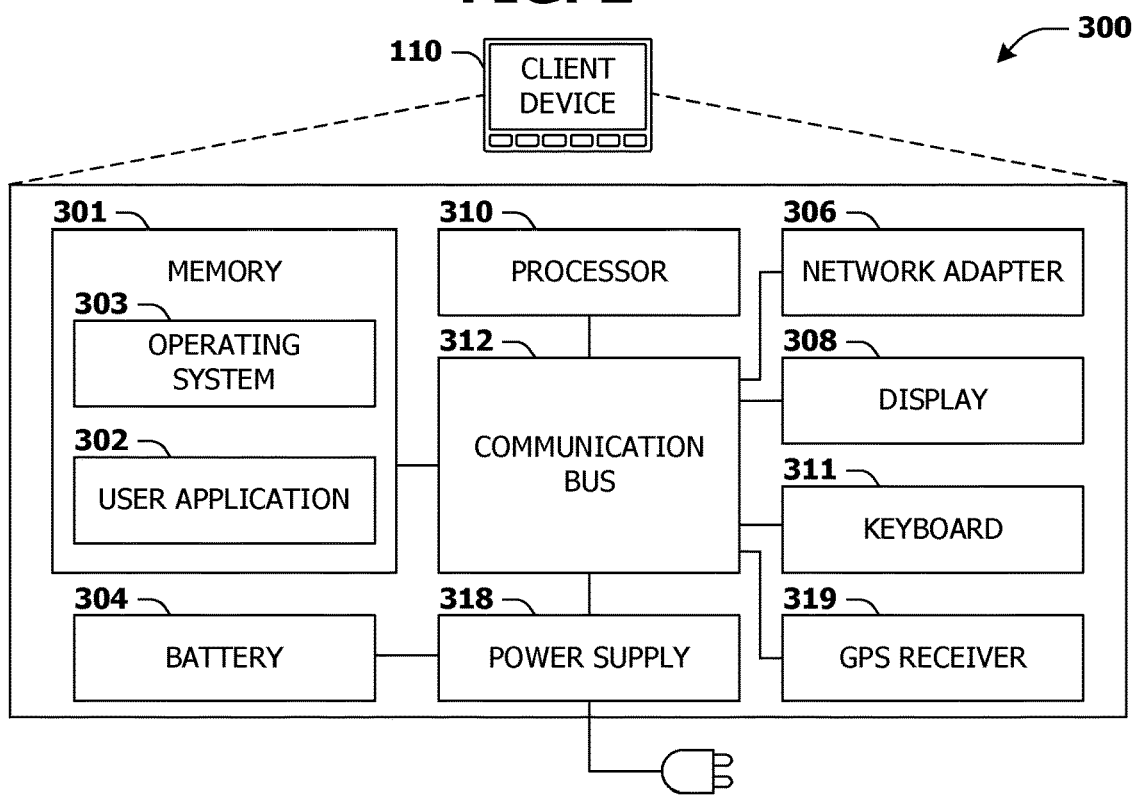
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining positive signal probabilities and/or selecting content are provided. Machine learning models with vector representations and/or weights associated with features are used to determine click probabilities associated with content items. In some systems, a machine learning model is generated without pruning, which leads to problems such as the machine learning model taking up large amounts of memory, long storage times for storing the machine learning model on a memory unit, etc. Further, a machine learning model with vector representations associated with relevant features may not meet certain storage requirements associated a storage system and/or memory unit. Some systems attempt to meet the storage requirements by not including vector representations and/or weights for some of the relevant features, which leads to less accurate determinations, predictions and/or suggestions by the machine learning model. Techniques are presented herein for performing one or more pruning operations to generate machine learning models with sparse vector representations. A machine learning model generated according to one or more of the techniques disclosed herein may have reduced space-complexity without sacrificing accuracy of determinations of positive signal probabilities by the machine learning model. Further, the machine learning model may meet storage requirements while containing information (e.g., sparse vector representations and/or weights) associated with a greater amount of relevant features than other machine learning models generated without pruning, and thus may provide more accurate determinations of positive signal probabilities. Further, the machine learning model may provide for faster determinations of positive signal probabilities, such as by way of providing for a reduced amount of computations (e.g., floating point computations) for determining positive signal probabilities. Accordingly, a greater amount of positive signal probabilities associated with a greater amount of content items can be determined in a time window within which content may need to be selected for presentation via a client device, and thus, a more accurate selection of content can be made within the time window.

Figure 4A:
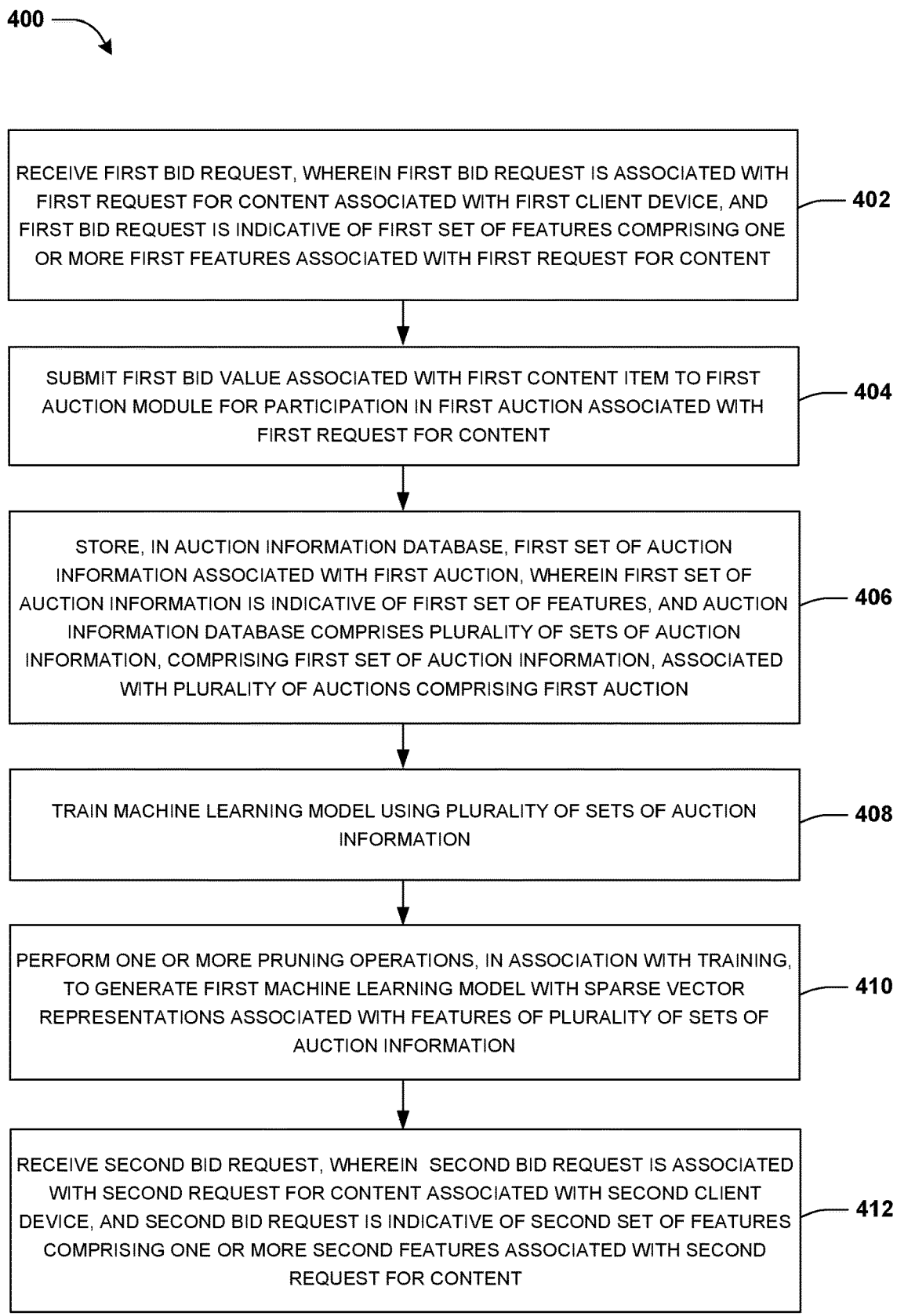
FIG. 4A is a first portion of a flow chart illustrating an example method for determining click probabilities associated with content items and/or selecting content for presentation to users.

An embodiment of determining click probabilities associated with content items and/or selecting content for presentation to users is illustrated by an example method 400 of FIGS. 4A-4B. In some examples, an entity may access and/or interact with a service, such as an advertising service, that provides a platform for uploading content to be presented via client devices to a content system. In some examples, the content system may be an advertisement system. Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

In some examples, a first content item may be received from a client device associated with a first entity. In some examples, the first entity may be an advertiser, a company, a brand, an organization, etc. Alternatively and/or additionally, the first content item may comprise at least one of an image, a video, audio, an interactive graphical object, etc. In some examples, the first content item may be an advertisement associated with the first entity (e.g., the advertisement may be used to promote one or more products, one or more services, etc. provided by the first entity).

Content information associated with the first content item and/or the first entity may be received. For example, the content information may comprise at least one of a budget associated with the first content item, a duration of time for which the first content item will be presented by the content system, a first target audience associated with the first content item, one or more advertisement campaign goals associated with the first content item (e.g., whether the entity is interested in clicks, conversions, and/or other interactions with respect to the content item, and/or a desired quantity of clicks, conversions, impressions, and/or other interactions with respect to the content item), a first content item bid value associated with the first content item, etc. In some examples, the budget may correspond to a budget to be spent during a period of time such as during a period of 24 hours.

A first user, such as user Jill, (and/or a first client device associated with the first user) may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

At 402, a first bid request may be received. In some examples, the first bid request is associated with a first request for content associated with the first client device. The first request for content may correspond to a request to be provided with one or more content items (e.g., advertisements, images, links, videos, etc.) for presentation via a first internet resource, such as in one or more serving areas of the first internet resource. The first internet resource corresponds to at least one of a web page of a website associated with the content system, an application associated with the content system, an internet game associated with the content system, etc.

In some examples, the first client device may transmit a request to access the first internet resource to a first server associated with the first internet resource. Responsive to receiving the request to access the first internet resource, the first server associated with the first internet resource may transmit first resource information associated with the first internet resource to the first client device. The first client device may transmit the first request for content to the content system responsive to receiving the first resource information. Alternatively and/or additionally, the first server associated with the first internet resource may transmit the first request for content to the content system responsive to receiving the request to access the first internet resource.

The first request for content may be received by a supply-side server and/or a content exchange (e.g., an ad exchange). The supply-side server may be associated with a supply-side platform (SSP) associated with the content system. The supply-side server and/or the content exchange may transmit the first bid request to a demand-side platform (DSP). The first bid request may correspond to a request for one or more bid values for participation in a first auction associated with the first request for content.

In some examples, the first bid request is indicative of a first set of features. The first set of features comprises one or more first features associated with the first request for content, the first internet resource and/or the first client device. In an example, the first set of features comprises at least one of the first internet resource associated with the first request for content, a domain name of the first internet resource, a top-level domain associated with the first internet resource, at least some of a web address of the first internet resource, etc. Alternatively and/or additionally, the first set of features may comprise a first time of day associated with the first request for content. The first time of day may correspond to a current time of day and/or a time of day of transmission of the first request for content. In some examples, the first time of day may correspond to a local time of day, such as a time of day at a first location associated with the first client device. Alternatively and/or additionally, the first set of features may comprise a first day of week (e.g., a local day of week associated with the first location) associated with the first request for content. Alternatively and/or additionally, the first set of features may comprise the first location associated with the first client device (e.g., at least one of a region, a state, a province, a country, etc. associated with the first client device). Alternatively and/or additionally, the first set of features may comprise information associated with the first client device, such as an indication of the first client device (such as at least one of a device identifier associated with the first client device, an IP address associated with the first client device, a carrier identifier indicative of carrier information associated with the first client device, a user identifier (e.g., at least one of a username associated with a first user account associated with the first client device, an email address, a user account identifier, etc.) associated with the first client device, a browser cookie, etc.).

In some examples, a second set of features associated with the first request for content may be determined based upon the first bid request. In an example, the second set of features may correspond to information indicated by the first user profile associated with the first user. For example, responsive to receiving the first bid request and/or the first request for content, a user profile database comprising a plurality of user profiles may be analyzed based upon the indication of the first client device to identify the first user profile associated with the first client device. The first user profile may be identified based upon a determination that the indication of the first client device in the first request for content and/or the first bid request matches device identification information indicated by the first user profile. The second set of features may comprise one or more searches performed by the first client device and/or the first user account of the first user, one or more queries used to perform the one or more searches, one or more internet resources (e.g., at least one of one or more web-pages, one or more articles, one or more emails, one or more content items, etc.) accessed and/or selected by the first client device and/or the first user account of the first user, demographic information associated with the first user (e.g., age, gender, occupation, income, etc.), etc.

In some examples, click probabilities associated with content items comprising the first content item may be determined. The click probabilities may comprise a first click probability associated with the first content item. For example, the first click probability may correspond to a probability of receiving a selection (e.g., a click) of the first content item responsive to presenting the first content item via the first client device. The first click probability may be determined (such as using one or more of the techniques described below with respect to determining a second click probability) based upon the first set of features, the second set of features and/or a third set of features associated with the first content item and/or the first entity. The third set of features may comprise at least one of an identification of the first entity, a type of content of the first content item (e.g., video, image, audio, etc.), one or more characteristics of the first content item (e.g., size, duration, etc.), a type of product and/or service that the first content item promotes (e.g., shoes, cars, etc.), a brand associated with the first content item (e.g., a brand of a product and/or service that the first content item promotes), etc.

In some examples, the first content item may be selected for presentation via the first client device based upon the click probabilities. For example, the first content item may be selected for presentation via the first client device based upon a determination that the first click probability is a highest click probability of the click probabilities. Alternatively and/or additionally, bid values associated with the content items may be determined based upon the click probabilities and/or other information (e.g., budgets, target audiences, campaign goals, entity-provided bid values, etc.). For example, the bid values may comprise a first bid value associated with the first content item. The first bid value may be determined based upon the first click probability and/or the content information associated with the first content item and/or the first entity, such as at least one of the budget associated with the first content item, the first target audience associated with the first content item, the one or more advertisement campaign goals associated with the first content item, the first content item bid value associated with the first content item, etc. The first content item may be selected for presentation via the first client device based upon a determination that the first bid value is a highest bid value of the bid values.

At 404, the first bid value associated with the first content item is submitted to a first auction module for participation in the first auction associated with the first request for content. In some examples, the first auction module corresponds to the SSP and/or the content exchange. Accordingly, the first bid value may be submitted to the first auction module by transmitting the first bid value to the SSP and/or the content exchange. In some examples, the first bid value is submitted to the first auction module in accordance with one or more specifications associated with the first auction module and/or the first auction. In an example, the one or more specifications may include a time window within which the first bid value should be submitted after receiving the first bid request, such as at least one of 10 milliseconds, 20 milliseconds, etc. Thus, the first bid value is determined and/or submitted within the time window after receiving the first bid request.

In some examples, after the first bid value is submitted and/or the first auction is performed, one or more messages may be received. The one or more messages may comprise a first impression indication. The first impression indication is indicative of whether the first content item is displayed via the first client device responsive to the first auction. The first impression indication may be received from the first client device and/or a server associated with the first internet resource (and/or a different server). The first client device and/or the server associated with the first internet resource (and/or a different server) may transmit the first impression indication. Alternatively and/or additionally, the one or more messages may comprise a first click indication. The first click indication may be indicative of whether the first content item is selected (e.g., clicked) via the first client device (e.g., whether the first content item is selected during presentation of the first content item via the first client device).

At 406, a first set of auction information associated with the first auction is stored in an auction information database. The first set of auction information is indicative of the first set of features, the second set of features, the third set of features, the first impression indication (such as if the first impression indication is received), the first click indication (such as if the first click indication is received), the first bid value and/or the first click probability. In some examples, the auction information database comprises a plurality of sets of auction information, comprising the first set of auction information, associated with a plurality of auctions comprising the first auction. For example, a set of auction information of the plurality of sets of auction information (and/or each set of auction information of the plurality of sets of auction information) is associated with an auction of the plurality of auctions and/or comprises at least one of features associated with the auction, an impression indication, a click indication, a bid value, a determined click probability, etc.

At 408, a machine learning model is trained using the plurality of sets of auction information. At 410, one or more pruning operations may be performed, in association with the training, to generate a first machine learning model with sparse vector representations associated with features of the plurality of sets of auction information. In some examples, not all vector representations of the first machine learning model are sparse, for example, the one or more pruning operations may comprise pruning one or more feature parameters of some vector representations while not pruning one or more feature parameters of other vector representations. Alternatively and/or additionally, all vector representations of the first machine learning model may be sparse, for example, the one or more pruning operations may comprise pruning at least one feature parameter of every vector representation of the first machine learning model.

The first machine learning model comprises a plurality of vector representations (e.g., embeddings and/or vector embeddings) associated with a first plurality of features of the plurality of sets of auction information. The first plurality of features may comprise at least some of the first set of features of the first set of auction information, at least some of the second set of features of the first set of auction information, at least some of the third set of features of the first set of auction information and/or other features indicated by sets of auction information, of the plurality of sets of auction information, other than the first set of auction information. Alternatively and/or additionally, the first machine learning model may comprise a bias parameter, such as comprising a bias weight. In some examples, the first machine learning model is generated by training one or more models, such as a factorization machine model, a field-weighted factorization machine model and/or a different type of model, using the plurality of sets of auction information. The plurality of vector representations of the first machine learning model may be comprised in a data structure.

Figure 5A:
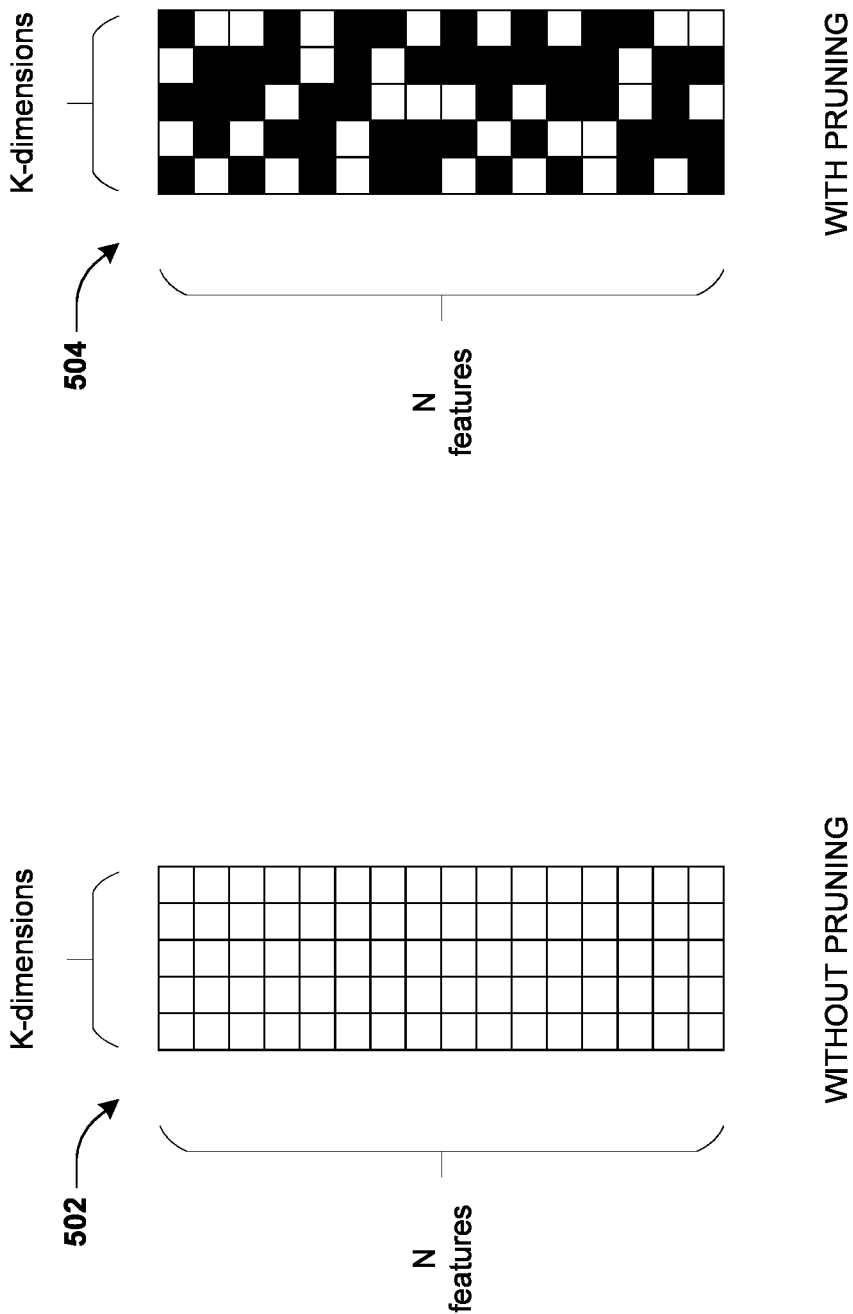
FIG. 5A illustrates a first matrix showing vector representations in an embodiment without pruning and a second matrix showing vector representations in an embodiment with pruning.

FIG. 5A illustrates a first matrix 502 showing vector representations associated with the first plurality of features in an embodiment without pruning (e.g., where the one or more pruning operations are not performed) and a second matrix 504 showing vector representations associated with the first plurality of features in an embodiment with pruning (e.g., where the one or more pruning operations are performed). In the first matrix 502 and the second matrix 504, the first plurality of features (e.g., N features) are arranged as rows and feature parameters associated with the first plurality of features are arranged as columns. In an example, a row of the first matrix 502 and the second matrix 504 may correspond to a vector representation associated with a feature of the first plurality of features. The row comprises feature parameters, of the vector representation, associated with the feature. The vector representation may be a K-dimensional vector representation. In some examples, such as shown in FIG. 5A, K may be 5 and the vector representation may comprise 5 feature parameters associated with the feature. A feature parameter of the vector representation may be reflective of one or more characteristics of the feature. In an example where the feature corresponds to a top-level domain of an internet resource, a feature parameter may be reflective of a characteristic of the top-level domain and/or the internet resource, examples of which are that the internet resource has a search platform, that the internet resource provides news articles, that the internet resource is an email platform, that the internet resource is a blog, etc. As shown by the second matrix 504, some feature parameters of vector representations of the first machine learning model are pruned (e.g., removed and/or set to zero). Exemplary pruned feature parameters are shown with black-filled matrix fields in FIG. 5A. Accordingly, vector representations of the first machine learning model, associated with features of the first plurality of features, are sparse as a result of performing the one or more pruning operations. Accordingly, the first machine learning model (and/or the vector representations of the first machine learning model) may have less space-complexity (e.g., requires less memory for storage) as a result of performing the one or more pruning operations as compared to machine learning models and/or vector representations generated without performing the one or more pruning operations.

In some examples, the one or more pruning operations are performed after machine learning model training. For example, machine learning model training may be performed using the plurality of sets of auction information to generate a second machine learning model with a plurality of vector representations and/or a plurality of weights. The one or more pruning operations may be performed by setting a plurality of feature parameters of the plurality of vector representations to zero to generate the first machine learning model with sparse vector representations (e.g., the one or more pruning operations be performed by performing one-shot pruning and/or other pruning techniques). Alternatively and/or additionally, the one or more pruning operations may be performed by setting a subset of weights of the plurality of weights to zero to generate the first machine learning model with sparse weights (e.g., one-shot pruning and/or other pruning techniques).

In some examples, at least some of the one or more pruning operations are performed in an iterative pruning process (e.g., an iterative process for structural pruning of feature parameters), in conjunction with machine learning model training. Iterations of the iterative pruning process may be performed according to a pruning schedule. For example, an iteration of the iterative pruning process may be performed according to a sparsity corresponding to the iteration. The sparsity may correspond to a proportion of feature parameters that have been pruned (e.g., removed and/or set to zero). The sparsity may increase throughout iterations of the iterative pruning process such that more feature parameters are set to zero in a subsequent iteration of the iterative pruning process than in a previous iteration preceding the subsequent iteration. In an example, a first iteration of the iterative pruning process may be performed according to a first sparsity and a second iteration following the first iteration may be performed according to a second sparsity greater than the first sparsity. In an example where the first sparsity is 10% and the second sparsity is 20%, 10% of feature parameters of the machine learning model may be pruned (e.g., removed and/or set to zero) during the first iteration, and 20% of the feature parameters of the machine learning model may be pruned during the first iteration and the second iteration. Iterations of the iterative pruning process may be performed until a target sparsity (e.g., between about 70% to about 95% such as about 90%, or a different value) is achieved. In an example where the target sparsity is 90%, the target sparsity may be achieved when at least 90% of feature parameters of the machine learning model are pruned.

In an example, a sparsity for an iteration of the iterative pruning process may correspond to $S(1-\mathbb{D}^{k/\mho})$, where S is the target sparsity, $\mathbb{D}$ and $\mho$ are damping parameters, and/or k corresponds to an iteration count of the iteration (e.g., k may be 1 for an initial iteration, k may be 2 for a next iteration after the initial iteration, etc.).

In some examples, after an iteration of the iterative pruning process (and/or between two iterations of the iterative pruning process), one or more machine learning model training steps may be performed (such as to retrain and/or fine-tune remaining feature parameters and/or weights that have not been removed and/or have not been set to zero).

In an example, one or more first training steps of the machine learning model training may be performed (such as using the plurality of sets of auction information) to generate a first plurality of vector representations. A vector representation of the first plurality of vector representations (and/or each vector representation of the first plurality of vector representations) may comprise multiple feature parameters (e.g., a quantity of the multiple feature parameters may be according to a quantity of dimensions of the vector representation). A first iteration (e.g., an initial iteration of the iterative pruning process) may be performed by setting a first plurality of feature parameters of the first plurality of vector representations to zero to generate a second plurality of vector representations having a first sparsity. The second plurality of vector representations may comprise zeros in place of the first plurality of feature parameters. After the first iteration and/or prior to a subsequent iteration, one or more second training steps of the machine learning model training may be performed using the second plurality of vector representations (such as to fine-tune and/or retrain remaining feature parameters of the second plurality of vector representations) to generate a third plurality of vector representations. A second iteration of the iterative pruning process (e.g., a next iteration after the first iteration) may be performed by setting a second plurality of feature parameters of the third plurality of vector representations to zero to generate a fourth plurality of vector representations having a second sparsity. The fourth plurality of vector representations may comprise zeros in place of the second plurality of feature parameters (and the fourth plurality of vector representations may comprise zeros in place of the first plurality of feature parameters that were pruned in the first iteration). Iterations of the iterative pruning process may be performed until a plurality of vector representations is generated that has a sparsity that is at least the target sparsity. In an example where the first plurality of vector representations generated prior to the first iteration comprises 1,000,000 feature parameters and the target sparsity is 90%, iterations of the iterative pruning process may be performed until at least 900,000 feature parameters are pruned (e.g., removed and/or set to zero). In some examples, responsive to performance of an iteration of the iterative pruning process that generates a plurality of vector representations with a sparsity that is at least the target sparsity, one or more machine learning model training steps may be performed to generate the first machine learning model with sparse vector representations.

In some examples, feature parameters may be pruned in an iteration of the iterative pruning process based upon weights associated with the feature parameters. For example, the first plurality of feature parameters of the first plurality of vector representations may be pruned in the first iteration based upon a determination that, among weights associated with feature parameters of the first plurality of vector representations, weights associated with the first plurality of feature parameters are lowest.

Alternatively and/or additionally, lowest feature parameters may be pruned (e.g., removed and/or set to zero) in an iteration of the iterative pruning process. For example, the first plurality of feature parameters may be set to zero in the first iteration based upon a determination that feature parameters of the first plurality of feature parameters are lowest (e.g., lowest magnitude) among feature parameters of the first plurality of vector representations.

Alternatively and/or additionally, feature parameters may be pruned (e.g., removed and/or set to zero) randomly in an iteration of the iterative pruning process. For example, feature parameters of the first plurality of feature parameters may be set to zero in the first iteration by randomly selecting the feature parameters for pruning from feature parameters of the first plurality of vector representations.

Figure 5B:
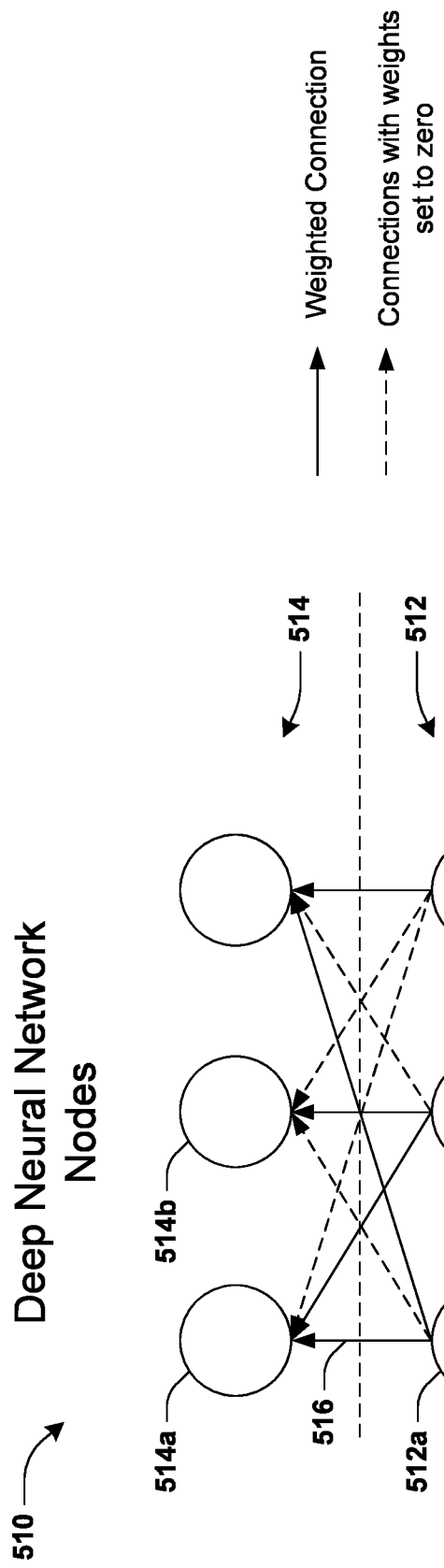
FIG. 5B is a component block diagram illustrating an example of pruned weights associated with deep neural network nodes.

In some examples, at least some of the one or more pruning operations are performed to prune weights of the machine learning model to generate the first machine learning model with sparse weights. For example, at least some of the one or more pruning operations may be performed in an iterative weight pruning process (e.g., an iterative process for structural pruning of weights). The iterative weight pruning process may comprise pruning weights associated with connections between deep neural network nodes associated with the machine learning model training. The connections may comprise inter-layer connections, such as connections between two layers of deep neural network nodes. The connections may comprise intra-layer connections, such as connections between deep neural network nodes of a single layer. FIG. 5B illustrates an example 510 of pruned weights associated with deep neural network nodes. Connections between a first layer 512 of deep neural network nodes and a second layer 514 of deep neural network nodes are shown with arrows in FIG. 5B. A connection 516 between a first node 512a of the first layer 512 and a second node 514a of the second layer 514 may correspond to a value being passed from the first node 512a to the second node 514a based upon a weight of the connection 516. In an example, a value of the first node 512a may be 2, the weight of the connection 516 may be 0.5, and the value that passes from the first node 512a to the second node 514a may be 2×0.5=1. Some weights of connections between the first layer 512 and the second layer 514 may be pruned, such as set to zero. Connections with weights set to zero are shown with dashed-line arrows in FIG. 5B. Values may not pass along a connection with a weight that is pruned. For example, a value may not pass from the first node 512a to a third node 514b of the second layer 514, such as due to a weight of a connection between the first node 512a and the third node 514b being set to zero. The first machine learning model (and/or weights of the first machine learning model) has less space-complexity (e.g., requires less memory for storage) as a result of performing the one or more pruning operations as compared to machine learning models and/or vector representations generated without performing the one or more pruning operations.

In some examples, the iterative weight pruning process is performed in conjunction with machine learning model training. Iterations of the iterative weight pruning process may be performed according to a pruning schedule. For example, an iteration of the iterative weight pruning process may be performed according to a sparsity corresponding to the iteration. The sparsity may correspond to a proportion of weights that have been removed and/or set to zero. The sparsity may increase throughout iterations of the iterative weight pruning process such that more weights are set to zero in a subsequent iteration of the iterative weight pruning process than in a previous iteration preceding the subsequent iteration. In an example, a first iteration of the iterative weight pruning process may be performed according to a first sparsity and a second iteration following the first iteration may be performed according to a second sparsity greater than the first sparsity. In an example where the first sparsity is 10% and the second sparsity is 20%, 10% of weights (e.g., weights of a deep neural network component of the machine learning model) may be pruned (e.g., removed and/or set to zero) during the first iteration, and 20% of the weights may be pruned during the first iteration and the second iteration. Iterations of the iterative weight pruning process may be performed until a target sparsity (e.g., between about 70% to about 95% such as about 90%, or a different value) is achieved. In an example where the target sparsity is 90%, the target sparsity may be achieved when at least 90% of weights (e.g., weights of the deep neural network component of the machine learning model) are pruned.

In an example, a sparsity for an iteration of the iterative weight pruning process may correspond to $S(1-\mathbb{D}^{k/\mathcal{U}})$, where S is the target sparsity, $\mathbb{D}$ and $\mathcal{U}$ are damping parameters, and/or k corresponds to an iteration count of the iteration (e.g., k may be 1 for an initial iteration, k may be 2 for a next iteration after the initial iteration, etc.).

In some examples, after an iteration of the iterative weight pruning process (and/or between two iterations of the iterative weight pruning process), one or more machine learning model training steps may be performed (such as to retrain and/or fine-tune remaining feature parameters and/or weights that have not been removed and/or have not been set to zero).

In an example, one or more first training steps of the machine learning model training may be performed (such as using the plurality of sets of auction information) to generate a first plurality of weights. The first plurality of weights may be associated with connections between deep neural network nodes. A first weight pruning iteration (e.g., an initial weight pruning iteration of the iterative weight pruning process) may be performed by setting a first subset of weights, of the first plurality of weights, to zero to generate a second plurality of weights having a first sparsity. For example, the first weight pruning iteration may be performed (and/or the first subset of weights may be set to zero) based upon the first sparsity (e.g., such that the second plurality of weights has the first sparsity). The second plurality of weights may comprise zeros in place of the first subset of weights. The first sparsity may correspond to a proportion of the second plurality of weights that are set to zero. After the first weight pruning iteration and/or prior to a subsequent weight pruning iteration, one or more second training steps of the machine learning model training may be performed using the second plurality of weights (such as to fine-tune and/or retrain remaining weights of the second plurality of weights) to generate a third plurality of weights. A second weight pruning iteration of the iterative weight pruning process (e.g., a next weight pruning iteration after the first weight pruning iteration) may be performed by setting a second subset of weights of the third plurality of weights to zero to generate a fourth plurality of weights having a second sparsity. For example, the second weight pruning iteration may be performed (and/or the second subset of weights may be set to zero) based upon the second sparsity (e.g., such that the fourth plurality of weights has the second sparsity). The fourth plurality of weights may comprise zeros in place of the first subset of weights and the second subset of weights. Iterations of the iterative weight pruning process may be performed until a plurality of weights is generated that has a sparsity that is at least a second target sparsity. In some examples, responsive to performance of an iteration of the iterative weight pruning process that generates a plurality of weights with a sparsity that is at least the second target sparsity, one or more machine learning model training steps may be performed using the plurality of weights to generate the first machine learning model.

In some examples, lowest weights may be pruned (e.g., removed and/or set to zero) in an iteration of the iterative weight pruning process. For example, the first subset of weights may be set to zero in the first weight pruning iteration based upon a determination that weights of the first subset of weights are lowest (e.g., lowest magnitude) among the first plurality of weights.

In some examples, such as where the first machine learning model has a bias weight, the bias weight of the first machine learning model may not be pruned (e.g., the bias weight may not be removed and/or set to zero to generate the first machine learning model).

In some examples, the iterative pruning process for pruning feature parameters may comprise pruning weights (e.g., weights of a deep neural network component). For example, an iteration of the iterative pruning process may comprise pruning one or more feature parameters and one or more weights. In an example, the first iteration of the iterative pruning process may comprise setting the first plurality of feature parameters of the first plurality of vector representations to zero and setting the first subset of weights to zero.

Performing the one or more pruning operations (such as in accordance with one or more of the techniques disclosed herein) to generate the first machine learning model with sparse vector representations and/or sparse weights provides for an improvement to the first machine learning model such that at least one of a space-complexity of the first machine learning model is reduced (e.g., the first machine learning model requires less memory for storage) without sacrificing accuracy of the first machine learning model. For example, where a target sparsity of 90% is used for pruning weights and/or feature parameters to generate the first machine learning model, memory required to store the first machine learning model is about 10% of memory that would be required without pruning, which leads to faster storage times. An accuracy with which the first machine learning model determines probabilities and/or other outputs is not reduced and/or is improved as a result of pruning feature parameters and/or weights (e.g., click probabilities determined by the first machine learning model are more accurate than click probabilities determined by a machine learning model generated without pruning). Alternatively and/or additionally, performance of the first machine learning model, such as indicated by a receiver operating characteristic (ROC) and/or an area under a ROC curve (AUC) associated with the first machine learning model, is not worsened and/or is improved as a result of pruning feature parameters and/or weights.

The first machine learning model may be stored on one or more servers associated with the content system. For example, the one or more servers may correspond to one or more DSPs. In some examples, the first machine learning model may be stored with a compressed format (e.g., Compressed Sparse Row (CSR) format).

In some examples, there may be storage requirements (e.g., memory limitations) associated with storage of the first machine learning model on a server. For example, the server may allocate a certain amount of memory for storage of the first machine learning model. A machine learning model generated without pruning feature parameters and/or weights may not meet (e.g., may exceed) a threshold size corresponding to allocated memory. Some systems attempt to meet the threshold size by not including relevant features in the machine learning model. However, by performing pruning operations to generate the first machine learning model, more relevant features can be included in the first machine learning model while still meeting the storage requirements (e.g., the first machine learning model may be less than or equal to the threshold size). In some examples, such as where the machine learning model is configured for news recommendation, the machine learning model may have features that correspond to words (e.g., unique words) of articles (e.g., news articles). In order to meet the storage requirements, however, some systems only include a subset of words (such as limited to words of titles of articles) as features in the machine learning model and other words, such as unique words from the body of an article, are not included as features in the machine learning model so as not to exceed the threshold size, thereby contributing to less accurate determinations, predictions and/or suggestions by the machine learning model. By performing pruning operations, such as using one or more of the techniques disclosed herein, both words in titles of articles and words in bodies of articles can be included as features in the first machine learning model, such as at least due to a reduction in data (e.g., data comprising feature parameters and/or weights) stored for each feature.

In an example, a quantity of unique words in titles of articles from a database is about 1 million, a quantity of unique words in bodies of the articles from the database is about 10 million, and/or 1000-dimensional vector representations may be generated for each feature (e.g., each unique word). The threshold size (e.g., memory allocated for a machine learning model) may be about 5 gigabytes. Without pruning, a machine learning model may a size of about (1,000,000 title words+10,000,000 article words)×1000 dimensions×4=44 gigabytes, which exceeds the threshold size. Some systems attempt to meet storage requirements by only including unique words in titles of articles as features in a machine learning model, i.e., 1,000,000 title words× 1000 dimensions×4=4 gigabytes, which is less than the threshold size. However, by pruning with a 90% target sparsity, such as in accordance with one or more of the techniques disclosed herein, both unique words of titles of articles and unique words of bodies of articles can be included as features in the first machine learning model (e.g., (1,000,000 title words+10,000,000 article words)×1000 dimensions×(1−0.9 target sparsity)×4=4.4 gigabytes, which is less than the threshold size).

FIGS. 6A-6G illustrate examples of a system 601 for determining click probabilities associated with content items and/or selecting content for presentation to users, described with respect to the method 400 of FIGS. 4A-4B. A second user (and/or a second client device 600) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system. In some examples, the content system may use user information, such as a second user profile comprising activity information (e.g., search history information, website browsing history, email information, selected content items, etc.), demographic information associated with the second user, location information, etc. to determine interests of the second user and/or select content for presentation to the second user based upon the interests of the second user.

Figure 6A:
FIG. 6A is a component block diagram illustrating an example system for determining click probabilities associated with content items and/or selecting content for presentation to users, where a client device presents and/or accesses a first webpage using a browser of the client device.

FIG. 6A illustrates the second client device 600 presenting and/or accessing a first web page 608 using a browser of the second client device 600. The browser may comprise an address bar 602 comprising a web address (e.g., a uniform resource locator (URL)) of the first web page 608. The first web page 608 may comprise a search interface. For example, the search interface may comprise a web search engine designed to search for information throughout the internet. In some examples, the first web page 608 may comprise a search field 606. For example, a query "stock market" may be entered into the search field 606. In some examples, the first web page 608 may comprise a search selectable input 604 corresponding to performing a search based upon the query. For example, the search selectable input 604 may be selected.

Figure 6B:
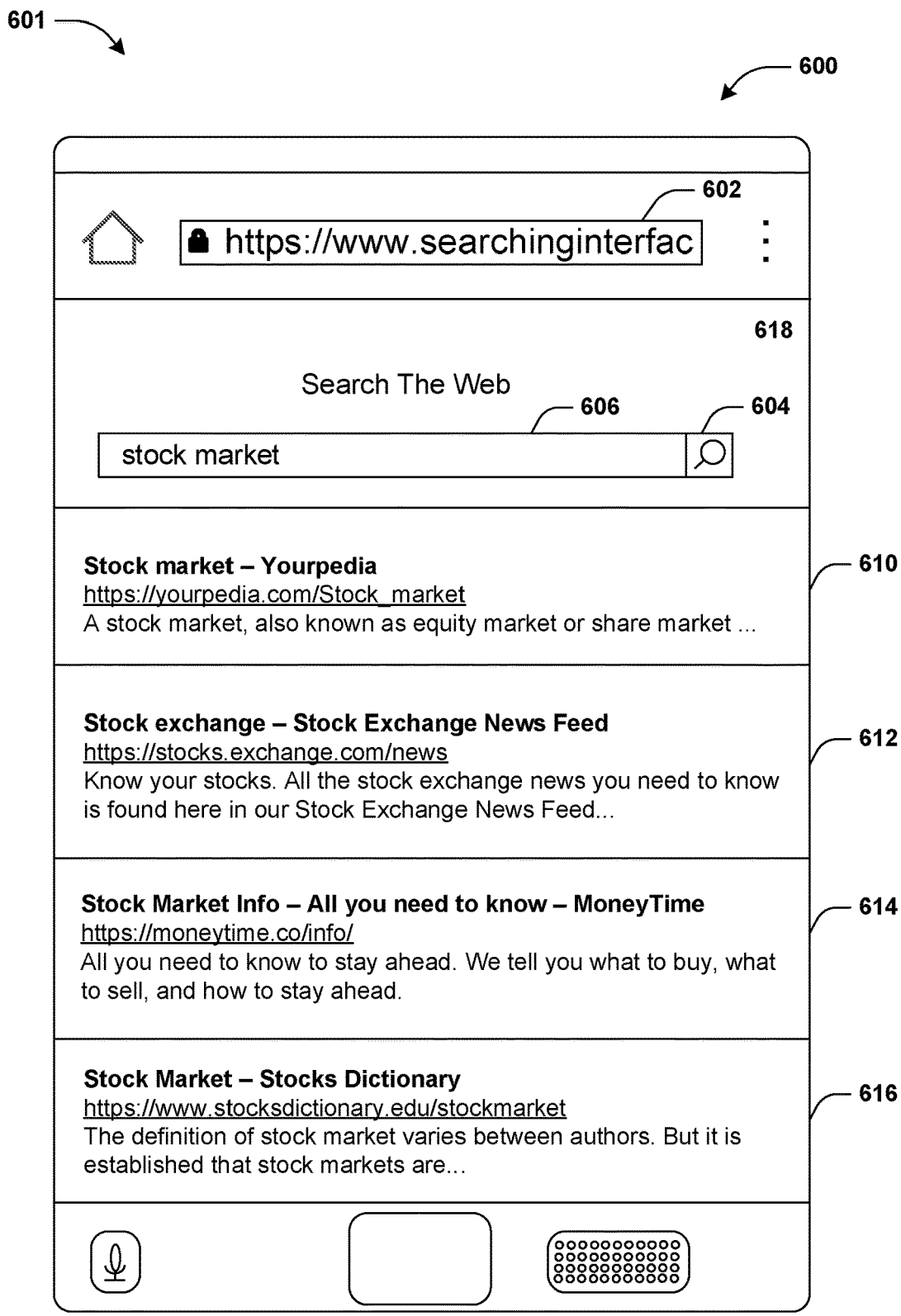
FIG. 6B is a component block diagram illustrating an example system for determining click probabilities associated with content items and/or selecting content for presentation to users, where a client device presents a plurality of search results associated with a query using a browser of the client device.

FIG. 6B illustrates the second client device 600 presenting a plurality of search results associated with the query using the browser of the second client device 600. For example, the plurality of search results may be presented within a second web page 618. For example, the plurality of search results may comprise a first search result 610 corresponding to a third web page, a second search result 612 corresponding to a fourth web page 644 (illustrated in FIG. 6G), a third search result 614 corresponding to a fifth web page and/or a fourth search result 616 corresponding to a sixth web page.

In some examples, each search result of the plurality of search results may comprise a selectable input (e.g., a link) corresponding to accessing a web page associated with the search result. In some examples, the second search result 612 corresponding to the fourth web page 644 may be selected (e.g., the second search result 612 may be selected via a second selectable input corresponding to the second search result 612).

Figure 6C:
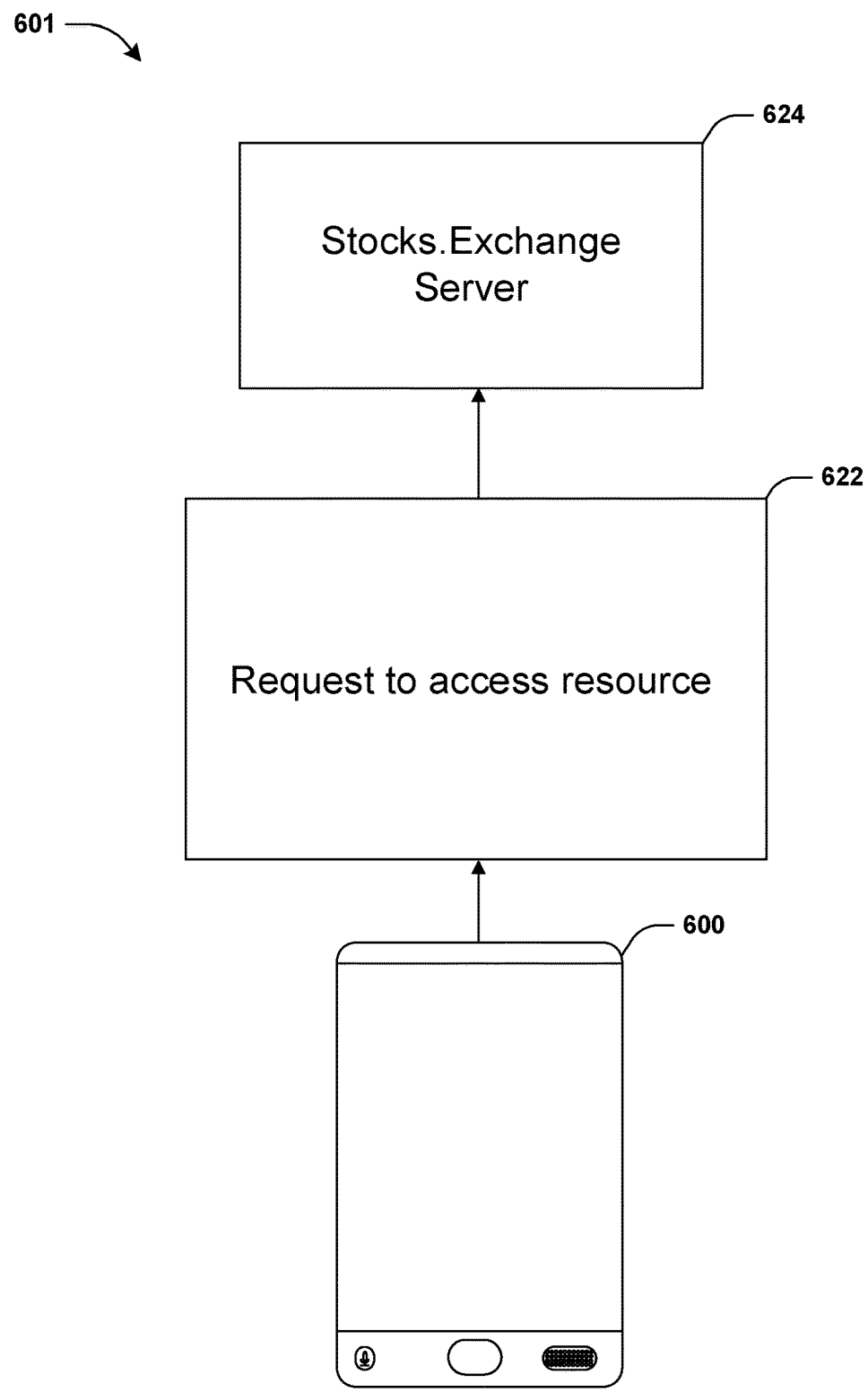
FIG. 6C is a component block diagram illustrating an example system for determining click probabilities associated with content items and/or selecting content for presentation to users, where a client device transmits a request to access a resource to a server.

FIG. 6C illustrates the second client device 600 transmitting a request 622 to access a resource to a server 624. In some examples, the request 622 to access the resource may be transmitted responsive to the second search result 612 being selected. For example, the resource may correspond to the fourth web page 644. For example, the request 622 to access the resource may comprise an indication of the fourth web page 644 (e.g., a web address "https://stocks.exchange.com/news"). Alternatively and/or additionally, the server 624 may be associated with the fourth web page 644.

Figure 6D:
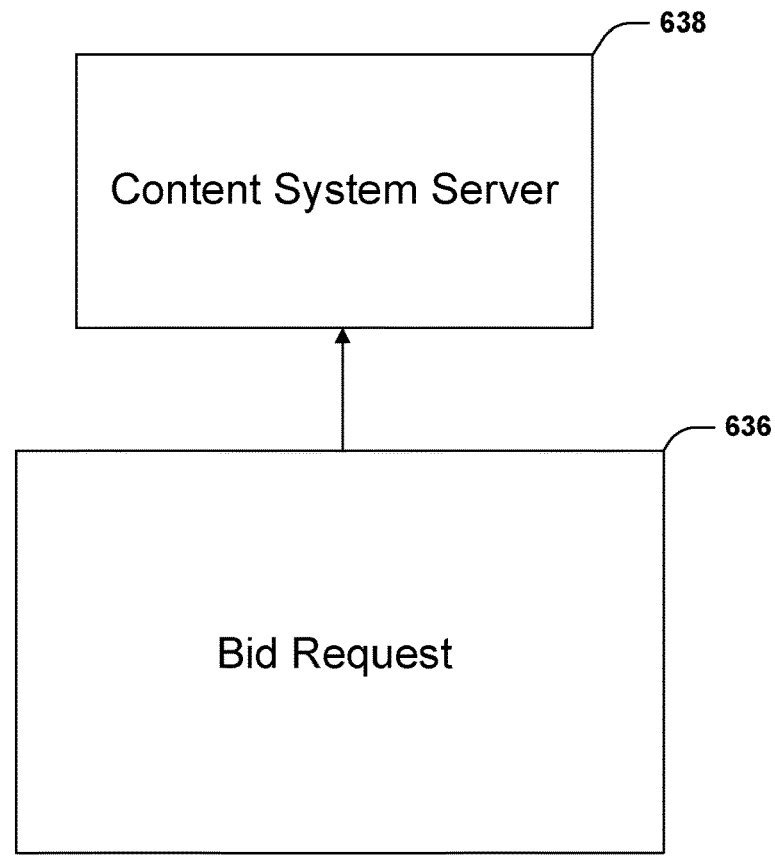
FIG. 6D is a component block diagram illustrating an example system for determining click probabilities associated with content items and/or selecting content for presentation to users, where a bid request is received.

In some examples, responsive to receiving the request 622 to access the resource, the server 624 associated with the fourth web page 644 may transmit second resource information associated with the fourth web page 644 to the second client device 600. The second client device 600 may transmit a second request for content to the content system (such as to a second SSP and/or a second content exchange associated with the content system) responsive to receiving the second resource information. Alternatively and/or additionally, the server 624 associated with the fourth web page 644 may transmit the second request for content to the content system (such as to the second SSP and/or the second content exchange associated with the content system), responsive to receiving the request 622 to access the resource. In some examples, the second request for content may correspond to a request to be provided with one or more content items (e.g., advertisements, images, links, videos, etc.) for presentation via the fourth web page 644, such as in one or more serving areas of the fourth web page 644 (e.g., the one or more serving areas may comprise an upper portion of the fourth web page 644 as illustrated in FIG. 6G and/or a different portion of the fourth web page 644).

At 412, a second bid request is received. FIG. 6D illustrates reception of the second bid request (shown with reference number 636). The second bid request 636 may be received by a server 638 associated with the content system. For example, the server 638 may correspond to a DSP. In some examples, the second bid request 636 is associated with the second request for content associated with the second client device 600. The second bid request 636 may be received from the second SSP and/or the second content exchange associated with the content system. The second bid request 636 may correspond to a request for one or more bid values for participation in a second auction associated with the second request for content.

In some examples, the second bid request may be indicative of a fourth set of features. The fourth set of features comprises one or more second features associated with the second request for content, the fourth web page 644 and/or the second client device 600. In an example, the fourth set of features may comprise at least one of the fourth web page 644, a domain name of the fourth web page 644, a top-level domain associated with the fourth web page 644 (e.g., stocks.exchange.com), at least some of a web address of the fourth web page 644 (e.g., "https://stocks.exchange.com/news"), etc. Alternatively and/or additionally, the fourth set of features may comprise a second time of day associated with the second request for content. The second time of day may correspond to a current time of day and/or a time of day of transmission of the second request for content. In some examples, the second time of day may correspond to a local time of day, such as a time of day at a second location associated with the second client device 600. Alternatively and/or additionally, the fourth set of features may comprise a second day of week (e.g., a local day of week associated with the second location) associated with the second request for content. Alternatively and/or additionally, the fourth set of features may comprise the second location associated with the second client device 600 (e.g., at least one of a region, a state, a province, a country, etc. associated with the second client device 600). Alternatively and/or additionally, the fourth set of features may comprise information associated with the second client device 600, such as an indication of the second client device 600 (such as at least one of a device identifier associated with the second client device 600, an IP address associated with the second client device 600, a carrier identifier indicative of carrier information associated with the second client device 600, a user identifier (e.g., at least one of a username associated with a second user account associated with the second client device 600, an email address, a user account identifier, etc.) associated with the second client device 600, a browser cookie, etc.).

At 414, a plurality of click probabilities associated with a plurality of content items may be determined using the first machine learning model based upon one or more first sparse vector representations, of the first machine learning model, associated with the fourth set of features. A second click probability of the plurality of click probabilities may be associated with a second content item of the plurality of content items. The second click probability may correspond to a probability of receiving a selection (e.g., a click) of the second content item responsive to presenting the second content item via the second client device 600.

Figure 6E:
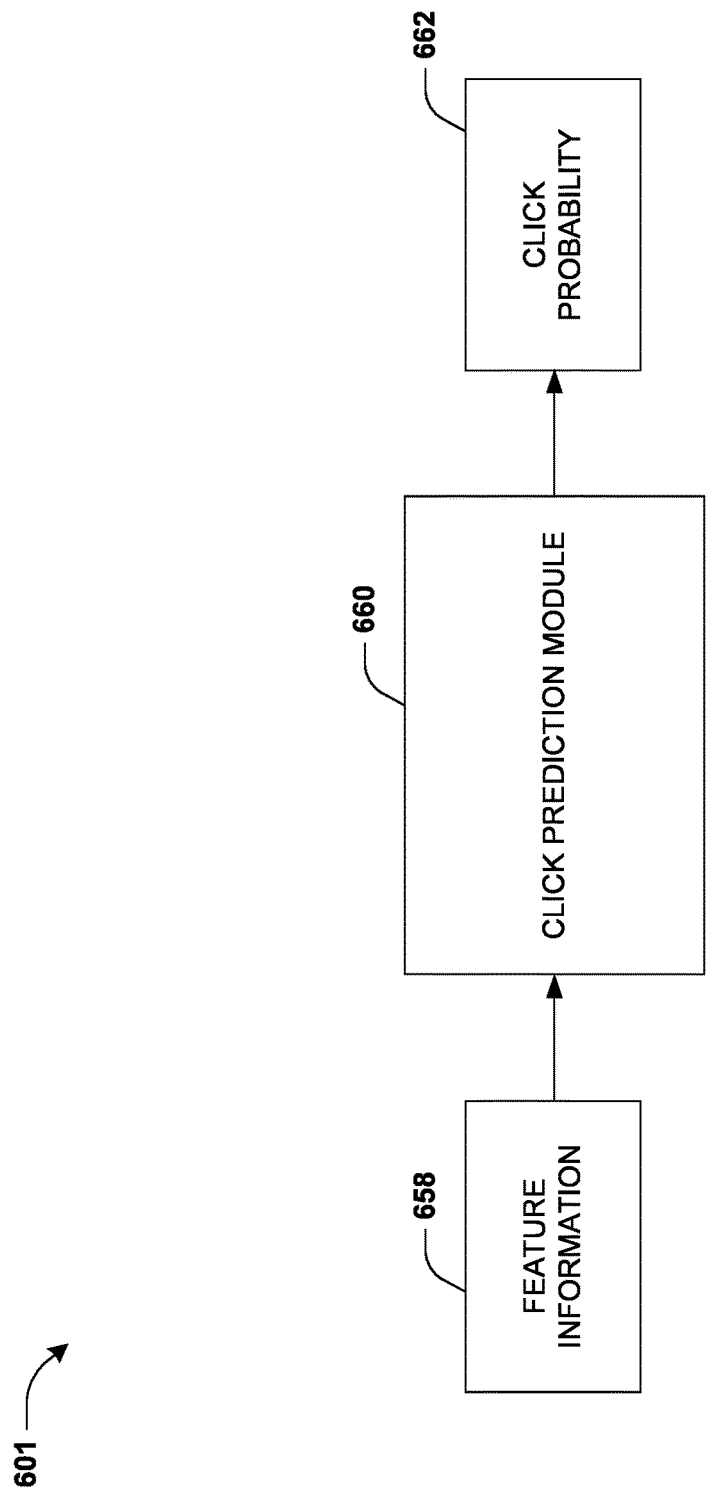
FIG. 6E is a component block diagram illustrating an example system for determining click probabilities associated with content items and/or selecting content for presentation to users, where a second click probability is determined.

FIG. 6E illustrates determination of the second click probability (shown with reference number 662). Feature information 658 may be input to a click prediction module 660 comprising the first machine learning model. In some examples, the feature information 658 is indicative of a second plurality of features comprising the fourth set of features and/or other features associated with the second request for content and/or the second client device 600. For example, the second plurality of features of the feature information 658 may comprise a fifth set of features associated with the request for content. The fifth set of features may be determined based upon the second user profile associated with the second user. The fifth set of features may comprise one or more searches performed by the second client device 600 and/or the second user account of the second user, one or more queries used to perform the one or more searches, one or more internet resources (e.g., at least one of one or more web-pages, one or more articles, one or more emails, one or more content items, etc.) accessed and/or selected by the second client device 600 and/or the second user account of the second user, demographic information associated with the second user (e.g., age, gender, occupation, income, etc.), etc.

Alternatively and/or additionally, the second plurality of features of the feature information 658 may comprise a sixth set of features associated with the second content item and/or a second entity associated with the second content item. In some examples, the second entity may be an advertiser, a company, a brand, an organization, etc. Alternatively and/or additionally, the second content item may comprise at least one of an image, a video, audio, an interactive graphical object, etc. In some examples, the second content item may be an advertisement associated with the second entity (e.g., the advertisement may be used to promote one or more products, one or more services, etc. provided by the second entity). In some examples, the sixth set of features may comprise at least one of an identification of the second entity, a type of content of the second content item (e.g., video, image, audio, etc.), one or more characteristics of the second content item (e.g., size, duration, etc.), a type of product and/or service that the second content item promotes (e.g., shoes, cars, etc.), a brand associated with the second content item (e.g., a brand of a product and/or service that the first content item promotes), etc.

In some examples, the first machine learning model may have a plurality of weights associated with the second plurality of features. The click prediction module 660 may perform logistic regression to determine a first value. The first value may correspond to $\sum_{i=1}^{N} x_i w_i$, where N corresponds to a quantity of features of the first machine learning model, i corresponds to a feature index associated with features of the first machine learning model, x corresponds to a feature value of a feature (e.g., x may be 0 if the feature according to the feature index is not included in the second plurality of features and/or x may be 1 if the feature according to the feature index is included in the second plurality of features), and/or w corresponds to a weight associated with the feature. Accordingly, the first value may be determined by determining one or more products, where each product of the one or more products is a product of a feature value x of a feature and a weight associated with the feature, and/or combining (e.g., summing) the one or more products. In some examples, the first value is equal to a sum of the plurality of weights associated with the second plurality of features. Alternatively and/or additionally, the first value may be determined by performing one or more other operations (e.g., mathematical operations).

In some examples, one or more interactions between pairs of features of the second plurality of features may be determined. In an example, the second plurality of features comprises three features feature A, feature B, and feature C. The one or more interactions may include an interaction between feature A and feature B, an interaction between feature A and feature C, and/or an interaction between feature B and feature C.

In some examples, the one or more interactions may comprise a first interaction between a second feature of the second plurality of features and a third feature of the second plurality of features. The first interaction may be determined based upon a second vector representation associated with the second feature and/or a third vector representation associated with the third feature. The third vector representation may be determined based upon a third feature parameter, of the one or more first feature parameters, associated with the third feature. The first interaction may be determined by performing one or more operations (e.g., mathematical operations) using the second vector representation and/or the third vector representation. In an example, the first interaction may be determined by determining a dot product of the second vector representation and the third vector representation.

In some examples, the one or more interactions may comprise the first interaction between the second feature and the third feature and/or one or more other interactions between one or more other pairs of features of the fourth set of features. The one or more other interactions may be determined using one or more of the techniques described herein with respect to determining the first interaction.

A second value may be determined based upon the one or more interactions. For example, the second value may be determined by performing one or more operations (e.g., mathematical operations) using the one or more interactions. For example, the one or more interactions may be combined (e.g., summed) to determine the second value. In an example where an interaction, of the one or more interactions, between a pair of features is determined by determining a dot product of vector representations associated with the pair of features, the second value may correspond to $\sum_{i=1}^{m} \sum_{j=i+1}^{m} x_i x_j \langle v_i, v_j \rangle$, where N corresponds to a quantity of features of the first machine learning model, i corresponds to a feature index associated with features of the first machine learning model, x corresponds to a feature value of a feature (e.g., x may be 0 if the feature according to the feature index is not included in the second plurality of features and/or x may be 1 if the feature according to the feature index is included in the second plurality of features), v corresponds to a vector representation of a feature, and/or $\langle v_i, v_j \rangle$ corresponds to a dot product of a vector representation $v_i$ and a vector representation $v_j$. In some examples, such as where the first machine learning model corresponds to a field-weighted factorization machine model, a dot product of vector representations associated with a pair of features may be combined with (e.g., multiplied by) a field interaction weight associated with the pair of features to determine an interaction between the pair of features. For example, the field interaction weight may correspond to a weight associated with a field associated with one feature of the pair of features and a field associated with another feature of the pair of features (e.g., a field of features may correspond to at least one of a top-level domain field associated with top-level domain features, an age field associated with age features, an entity field associated with entity features, an advertiser field associated with advertiser features, etc.).

Figure 6F:
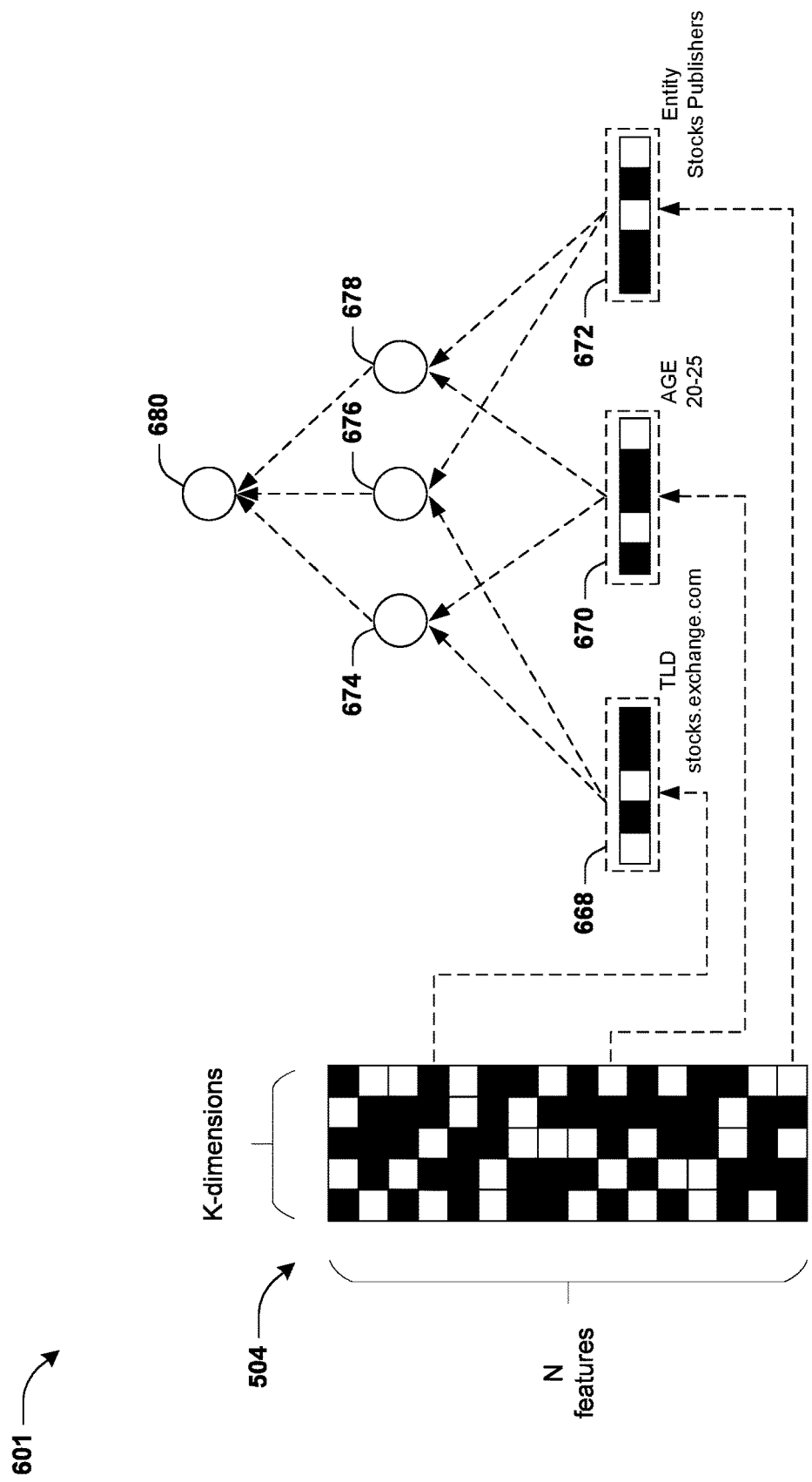
FIG. 6F is a component block diagram illustrating an example system for determining click probabilities associated with content items and/or selecting content for presentation to users, where a second value is determined.
Figure 6G:
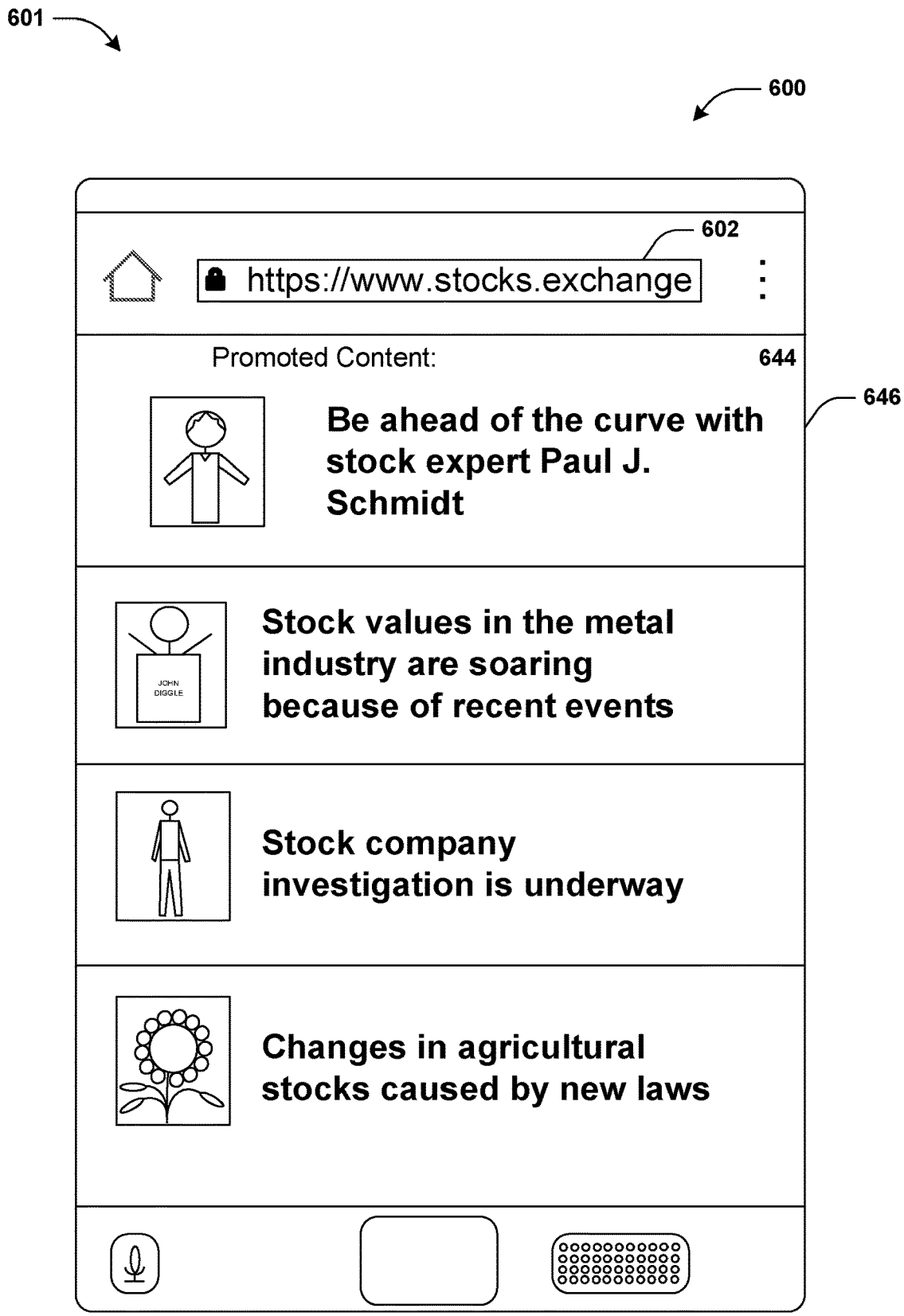
FIG. 6G is a component block diagram illustrating an example system for determining click probabilities associated with content items and/or selecting content for presentation to users, where a client device presents and/or accesses a fourth webpage using a browser of the client device.

FIG. 6F illustrates determination of the second value. In an example, the second plurality of features of the feature information 658 used to determine the click probability 662 comprises a top-level domain feature corresponding to the top-level domain associated with the fourth web page 644 (e.g., stocks.exchange.com), an age feature corresponding to an age of the second user (e.g., an age range of 20-25 years old), and/or an entity feature corresponding to an identification of the second entity (e.g., "Stocks Publishers"). The first machine learning model (e.g., the second matrix 504 of the first machine learning model) may have a first vector representation 668 associated with the top-level domain feature, a second vector representation 670 associated with the age feature and/or a third vector representation 672 associated with the entity feature. In some examples, the first vector representation 668, the second vector representation 670 and/or the third vector representation 672 may be sparse, such that at least one feature parameter of the first vector representation 668 is pruned (e.g., set to zero), at least one feature parameter of the second vector representation 670 is pruned, and/or at least one feature parameter of the third vector representation 672 is pruned. It may be appreciated that in some embodiments, not all vector representations of the first machine learning model (e.g., the second matrix 508) are sparse. For example, embodiments are contemplated where at least one of the vector representations are not pruned (e.g., a vector representation, of the first machine learning model, that is used to determine the second click probability may have a complete set of feature parameters, such as a set of feature parameters amounting to a quantity of dimensions of the vector representation).

In some examples, the one or more interactions may comprise a first interaction 674 between the top-level domain feature and the age feature, a second interaction 676 between the top-level domain feature and the entity feature, and a third interaction 678 between the age feature and the entity feature. The first interaction 674 may correspond to a dot product of the first vector representation 668 and the second vector representation 670. The second interaction 676 may correspond to a dot product of the first vector representation 668 and the third vector representation 672. The third interaction 678 may correspond to a dot product of the second vector representation 670 and the third vector representation 672. The first interaction 674, the second interaction 676 and the third interaction 678 (and/or one or more other interactions associated with one or more other features, of the second plurality of features, not shown in FIG. 6F) may be combined (e.g., summed) to determine the second value (shown with reference number 680 in FIG. 6F).

It may be appreciated that the first the first vector representation 668, the second vector representation 670 and/or the third vector representation 672 being sparse vector representations provides for faster computation of the interactions, such as at least due to reducing computations (e.g., floating point computations) needed for determining dot products of vector representations. Accordingly, click probabilities are determined more quickly using the first machine learning model as compared to other systems with machine learning models generated without pruning. Thus, a greater amount of click probabilities associated with a greater amount of content items can be determined in the time window after the second bid request is received, and thus, a more accurate selection of content can be made within the time window.

In some examples, the second click probability is determined based upon the first value and/or the second value. For example, the second click probability may be determined by performing one or more operations (e.g., mathematical operations) using the first value and/or the second value. For example, the first value and the second value may be combined (e.g., summed) to determine the second click probability.

In some examples, the second click probability is determined based upon the first value, the second value and/or a third value. The third value may correspond to the bias weight. The second click probability may be determined by performing one or more operations (e.g., mathematical operations) using the first value, the second value and/or the third value. For example, the first value, the second value and the third value may be combined (e.g., summed) to determine the second click probability. Alternatively and/or additionally, a value may be generated by combining (e.g., summing) the first value, the second value and the third value, and one or more mathematical operations (e.g., operations of a sigmoid function) may be performed to generate the second click probability from the value (e.g., the one or more mathematical operations may be performed to transform the value into the second click probability that may be between 0 to 1).

At 416, the second content item may be selected from the plurality of content items for presentation via the second client device 600 based upon the plurality of click probabilities. For example, the second content item may be selected from the plurality of content items based upon a determination that the second click probability associated with the second content item is a highest click probability of the plurality of click probabilities.

Alternatively and/or additionally, a plurality of bid values associated with the plurality of content items may be determined based upon the plurality of click probabilities and/or other information (e.g., budgets, target audiences, campaign goals, entity-provided bid values, etc.). The plurality of bid values may comprise a second bid value associated with the second content item. In some examples, the second bid value may be determined based upon at least one of a second budget associated with the second content item, a second target audience associated with the second content item, one or more second advertisement campaign goals associated with the second content item, a second content item bid value associated with the second content item received from the second entity, etc.

Alternatively and/or additionally, the second bid value may be determined based upon the second click probability associated with the second content item. The second bid value may correspond to a value of presenting the second content item via the second client device 600, such as determined based upon at least one of the second click probability, an amount of revenue (such as received by the second entity and/or one or more other entities) associated with receiving a selection of the second content item via the second client device 600, etc. In an example where the second click probability is 10% and/or the amount of revenue associated with receiving a selection of the second content item via the second client device 600 is $50.00, the second bid value may correspond to a combination of the second click probability and/or the amount of revenue (e.g., the second bid value may correspond to 10%× $50.00=$5.00).

In some examples, the second content item may be selected from the plurality of content items based upon a determination that the second bid value associated with the second content item is a highest bid value of the plurality of bid values.

At 418, the second bid value associated with the second content item may be submitted to a second auction module for participation in a second auction associated with the second request for content. In some examples, the second auction module corresponds to the second SSP and/or the second content exchange. Accordingly, the second shaded bid value may be submitted to the second auction module by transmitting the second shaded bid value to the second SSP and/or the second content exchange. The second auction module may be the same as the first auction module. Alternatively and/or additionally, the second auction module may be different than the first auction module. In some examples, the second auction module may analyze a plurality of bid values participating in the second auction to identify a winner of the second auction. In some examples, the second auction module may determine that the second bid value and/or the second content item associated with the second bid value are the winner of the second auction based upon a determination that the second bid value is a highest bid value of the plurality of bid values.

In some examples, responsive to determining that the second bid value and/or the second content item associated with the second bid value are the winner of the second auction, the second content item may be transmitted to the second client device 600. FIG. 6G illustrates the second client device 600 presenting and/or accessing the fourth web page 644 using the browser. For example, the content system may provide the second content item (shown with reference number 646) to be presented via the fourth web page 644 while the fourth web page 644 is accessed by the second client device 600.

Figure 7:
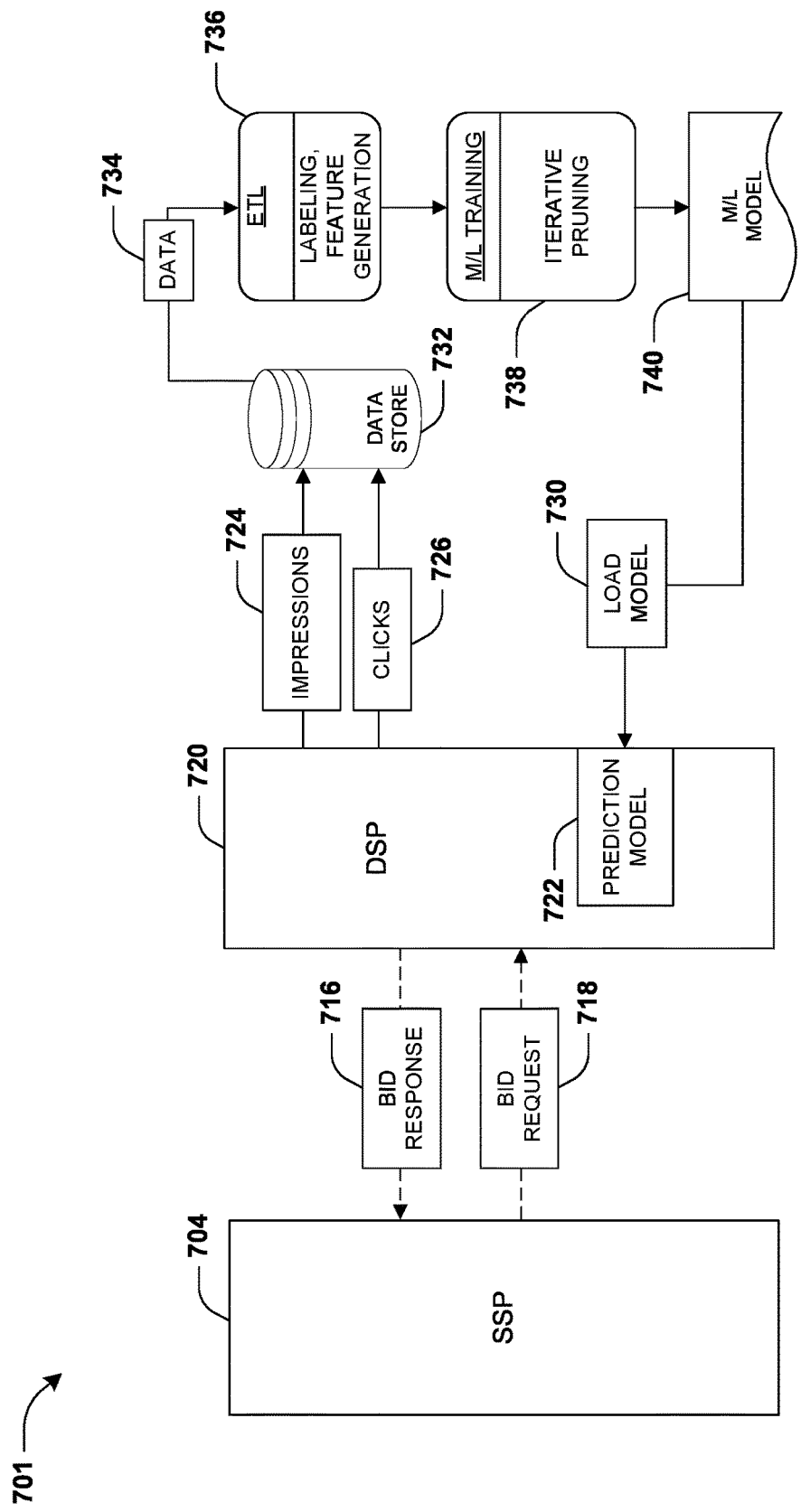
FIG. 7 is a component block diagram illustrating an example system for determining click probabilities associated with content items and/or selecting content for presentation to users.

FIG. 7 illustrates an example of a system 701 for determining click probabilities associated with content items and/or selecting content for presentation to users, described with respect to the method 400 of FIGS. 4A-4B. In some examples, an SSP 704 may receive a request for content (e.g., an advertisement request) from a client device. Responsive to receiving the request for content, the SSP 704 may transmit a bid request 718 to a DSP 720. Responsive to receiving the bid request 718, the DSP 720 may submit a bid response 716 to the SSP 704 (e.g., the bid response 716 may be submitted to an auction module of the SSP 704). The bid response 716 may comprise a bid value for participation in an auction associated with the request for content. In an example where a content item associated with the bid value is the winner of the auction, the content item may be presented via the client device. In some examples, a set of auction information (e.g., the first set of auction information) may be stored in a data store 732 (e.g., the auction information database). The set of auction information may comprise an impression indication 724 (such as indicative of the content item being presented via the client device), a click indication 726 (such as indicative of the content item being selected via the client device, a determined click probability associated with the content item and/or indications of one or more features (e.g., the first set of features, the second set of features and/or the third set of features) associated with the request for content, the bid request 718, the client device and/or the content item. Historical auction information (e.g., the plurality of sets of auction information) may be stored on the data store 732. Data 734 (e.g., the plurality of sets of auction information) from the data store 732 may be input to a module 736, such as an extraction transform and loading (ETL) module 736. The module 736 may be configured to run an ETL process to extract features from the data 734, generate features based upon the data 734 and/or label data points as positive samples and/or negative samples. Information, such as at least one of indications of features from the module 736, determined click probabilities, click indications, etc. may be input to a machine learning training module 738 configured to generate a machine learning model 740 (e.g., the first machine learning model), such as a factorization machine model and/or a field-weighted factorization machine model, with learned parameters. The machine learning model 740 may be generated via machine learning model training and pruning operations, such as using one or more of the techniques disclosed herein. The machine learning model 740, with sparse vector representations and/or sparse weights, may be loaded 730 onto a prediction module 722 of the DSP 720. The prediction module 722 (and/or the machine learning model 740) may be used to determine click probabilities (and/or other types of positive signal probabilities, such as described below with respect to example method 800). Content may be selected for presentation via client devices using the prediction module 722. In an example, responsive to receiving a second bid request, the DSP 720 may determine a bid value (e.g., an unshaded bid value). In some examples, the module 736 and/or the machine learning training module 738 may be offline components of the system 701 and the ETL process and/or machine learning model training may be performed periodically, such as once per day. Alternatively and/or additionally, the module 736 and/or the machine learning training module 738 may be online components of the system 701 and the ETL process and/or machine learning model training may be performed in real time.

Figure 8A:
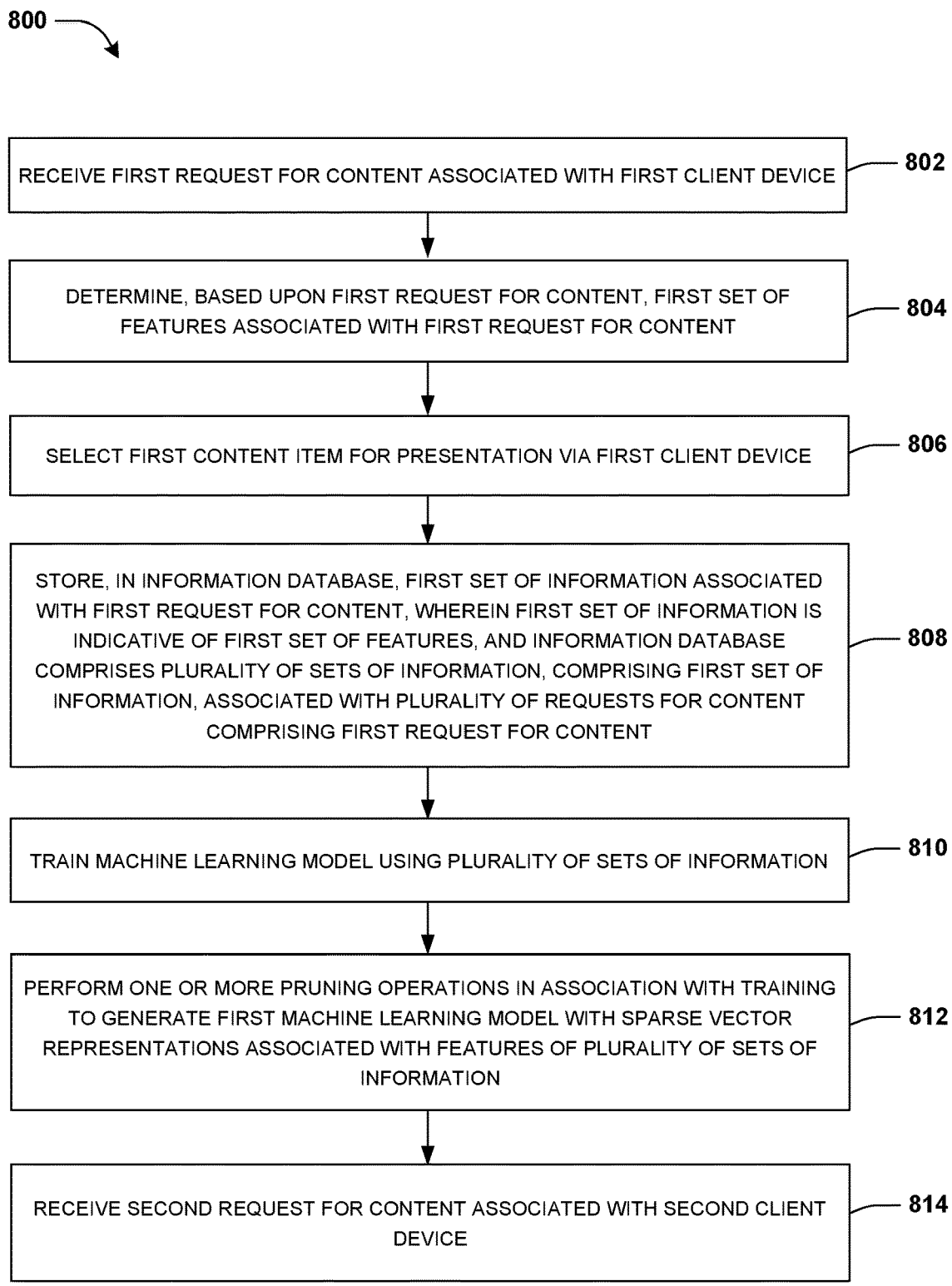
FIG. 8A is a first portion of a flow chart illustrating an example method for determining positive signal probabilities associated with content items and/or selecting content for presentation to users.
Figure 8B:
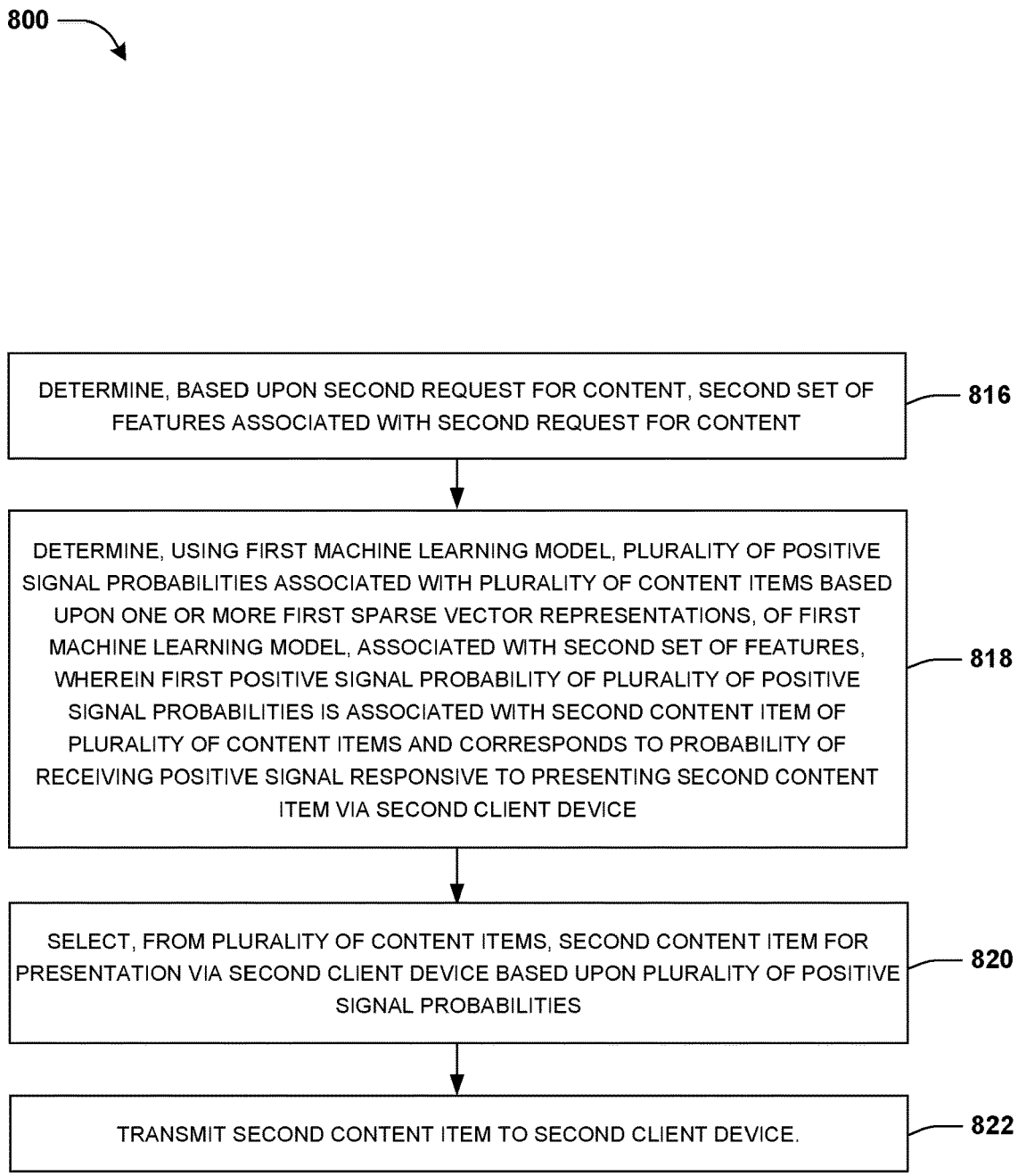
FIG. 8B is a second portion of a flow chart illustrating an example method for determining positive signal probabilities associated with content items and/or selecting content for presentation to users.

An embodiment of determining positive signal probabilities associated with content items and/or selecting content for presentation to users is illustrated by an example method 800 of FIGS. 8A-8B. At 802, a first request for content associated with a first client device may be received. The first request for content may correspond to a request for content, such as an image, a video, an article, an interactive graphical object, a web page, an advertisement, etc., to be presented on a first internet resource via the first client device.

In an example, the first internet resource may correspond to a content platform, such as used for presenting at least one of video (e.g., movies, video clips, etc.), audio (e.g., music, podcasts, interviews, etc.), articles (e.g., informational articles, blog posts, news articles, etc.), etc. The first request for content may correspond to a request to present a content item, such as at least one of play a video file (e.g., play a movie, a video clip, etc.), play an audio file (e.g., a song, a podcast, an interview, etc.), display an article, etc. Alternatively and/or additionally, the first request for content may correspond to a request to present a content item comprising a link to a suggested content item, such as a link to content (e.g., video, audio, article, etc.) that a first user associated with the first client device may be interested in and/or may enjoy consuming.

At 804, a first set of features associated with the first request for content may be determined. In some examples, the first request for content may comprise at least some of the first set of features, such as at least one of the first internet resource, a domain name of the first internet resource, a top-level domain associated with the first internet resource, at least some of a web address of the first internet resource, a first time of day associated with the first request for content, a first day of week associated with the first request for content, an indication of the first client device, etc. In some examples, at least some of the first set of features may be determined based upon a first user profile associated with the first client device, such as using one or more of the techniques disclosed herein. Features, of the first set of features, that are determined based upon the first user profile may comprise one or more searches performed by the first client device and/or the first user account of the first user, one or more queries used to perform the one or more searches, one or more internet resources (e.g., at least one of one or more web-pages, one or more articles, one or more emails, one or more content items, etc.) accessed and/or selected by the first client device and/or the first user account of the first user, demographic information associated with the first user (e.g., age, gender, occupation, income, etc.), etc.

At 806, a first content item may be selected for presentation via the first client device. The first content item may comprise at least one of an image, a video, an article, an interactive graphical object, a web page, an advertisement, etc. Alternatively and/or additionally, the first content item may comprise a link to at least one of an image, a video, an article, an interactive graphical object, a web page, etc. Responsive to selecting the first content item for presentation via the first client device, the first content item may be transmitted to the first client device and/or presented via the first client device on the first internet resource.

One or more indications indicative of device activity associated with presentation of the first content item may be received. For example, the one or more indications may be used to determine whether the first content item is selected (e.g., clicked) during presentation of the first content item.

Alternatively and/or additionally, the one or more indications may be used to determine whether a conversion event associated with the first content item is performed via the first client device and/or the first user. In an example, activity that constitutes a conversion event may correspond to at least one of a purchase of a product and/or a service advertised by the first content item, subscribing to (and/or signing up for) a service associated with a first entity associated with the first content item, contacting the first entity (e.g., contacting the first entity via one or more of email, phone, etc.), accessing a web page associated with the first entity, adding a product and/or a service associated with the first entity to a shopping cart on an online shopping platform, completing a form (e.g., a survey form), creating and/or registering an account (e.g., a user account) for a platform associated with the first entity (e.g., creating a shopping user account for an online shopping platform), downloading an application (e.g., a mobile application) associated with the first entity onto the first client device and/or installing the application on the first client device, opening and/or interacting with the application, utilizing one or more services associated with the first entity using the application, etc.

Alternatively and/or additionally, the one or more indications may be used to determine an amount of the first content item that is presented via the first client device. In an example where the first content item is a video, a proportion of the video that is presented via the first client device, and/or a duration of the video that is presented via the first client device, may be determined based upon the one or more indications. In an example where the first content item is an audio file, a proportion of the audio file that is presented via the first client device, and/or a duration of the audio file that is presented via the first client device, may be determined based upon the one or more indications. In an example where the first content item is an article, an image and/or other type of internet resource, a proportion of the first content item that is displayed via the first content item may be determined based upon the one or more indications. An amount of the first content item that is presented via the first client device may reflect an amount of interest that the first user has in the first content item. For example, in a scenario where the first content item is a video clip, a greater duration of the first content item being presented via the first client device may reflect a higher amount of interest (of the first user) in the first content item.

At 808, a first set of information associated with the first request for content may be stored in an information database. In some examples, the first set of information is indicative of the first set of features. Alternatively and/or additionally, the first set of information is indicative of activity information associated with presentation of the first content item via the first client device. For example, the activity information may be indicative of at least one of whether a selection (e.g., a click) of the first content item is received when the first content item is presented, whether a conversion event associated with the first content item is performed by the first client device and/or the first user during or after presentation of the first content item via the first client device, a proportion of the first content item that is presented via the first client device, an amount of the first content item that is presented via the first client device (e.g., a duration of a video and/or an audio file that is presented via the first client device, an amount of an image that is displayed via the first client device, etc.), etc. Alternatively and/or additionally, the first set of information may be indicative of first content item-related information, such as one or more features associated with the first content item and/or the first entity associated with the first content item. For example, the first content item-related information and/or the one or more features may comprise at least one of an identification of the first entity, a type of content of the first content item (e.g., video, image, audio, etc.), one or more characteristics of the first content item (e.g., size, duration, etc.), a type of product and/or service that the first content item promotes (e.g., shoes, cars, etc.), a brand associated with the first content item (e.g., a brand of a product and/or service that the first content item promotes), one or more words and/or unique words comprised in the first content item, one or more topics of the first content item, one or more identifications of subject matter of the first content item, an author of the first content item, a publisher of the first content item, a producer of the first content item, one or more artists associated with the first content item, one or more actors associated with the first content item, etc. In some examples, the information database comprises a plurality of sets of information, comprising the first set of information, associated with a plurality of requests for content comprising the first request for content. For example, a set of information of the plurality of sets of information (and/or each set of information of the plurality of sets of information) is associated with request for content of the plurality of requests for content and/or comprises at least one of features associated with the request for content, activity information, content item-related information associated with a presented content item, etc.

At 810, a machine learning model is trained using the plurality of sets of information, such as using one or more of the techniques disclosed herein. At 812, one or more pruning operations are performed, in association with the training, to generate a first machine learning model with sparse vector representations and/or sparse weights associated with features of the plurality of sets of information.

At 814, a second request for content associated with a second client device may be received. The second request for content may correspond to a request for content, such as an image, a video, an article, an interactive graphical object, a web page, an advertisement, etc., to be presented on a second internet resource via the second client device.

In an example, the second internet resource may correspond to the content platform or a different content platform, such as used for presenting at least one of video (e.g., movies, video clips, etc.), audio (e.g., music, podcasts, interviews, etc.), articles (e.g., informational articles, blog posts, news articles, etc.), etc. The second request for content may correspond to a request to present a content item, such as at least one of play a video file (e.g., play a movie, a video clip, etc.), play an audio file (e.g., a song, a podcast, an interview, etc.), display an article, etc. Alternatively and/or additionally, the second request for content may correspond to a request to present a content item comprising a link to a suggested content item, such as a link to content (e.g., video, audio, article, etc.) that a second user associated with the second client device may be interested in and/or may enjoy consuming.

At 816, a third set of features associated with the second request for content may be determined. In some examples, the second request for content may comprise at least some of the third set of features, such as at least one of the second internet resource, a domain name of the second internet resource, a top-level domain associated with the second internet resource, at least some of a web address of the second internet resource, a second time of day associated with the second request for content, a second day of week associated with the second request for content, an indication of the second client device, etc. In some examples, at least some of the third set of features may be determined based upon a second user profile associated with the second client device, such as using one or more of the techniques disclosed herein. Features, of the third set of features, that are determined based upon the second user profile may comprise one or more searches performed by the second client device and/or the second user account of the second user, one or more queries used to perform the one or more searches, one or more internet resources (e.g., at least one of one or more web-pages, one or more articles, one or more emails, one or more content items, etc.) accessed and/or selected by the second client device and/or the second user account of the second user, demographic information associated with second user (e.g., age, gender, occupation, income, etc.), etc.

At 818, a plurality of positive signal probabilities associated with a plurality of content items may be determined based upon one or more first sparse vector representations, of the first machine learning model, associated with the third set of features. The plurality of positive signal probabilities may be determined using one or more of the techniques disclosed herein, such as one or more of the techniques described with respect to the example method 400 for determining the second click probability.

The plurality of positive signal probabilities comprises a first positive signal probability associated with a second content item of the plurality of content items. The first positive signal probability corresponds to a probability of receiving a positive signal responsive to presenting the second content item via the second client device. For example, the positive signal may be indicative of a selection of the second content item and/or the first positive signal probability may correspond to a probability of receiving a selection (e.g., a click) of the second content item responsive to presenting the second content item via the second client device (e.g., the first positive signal probability may correspond to a click probability). Alternatively and/or additionally, the positive signal may be indicative of a conversion event associated with the second content item and/or the first positive signal probability may correspond to a probability of the second client device and/or the second user performing a conversion event associated with the second content item during and/or after presentation the second content item via the second client device (if the second content item is presented via the second client device). Alternatively and/or additionally, the positive signal may be indicative of a threshold amount of the second content item being presented via the second client device and/or the first positive signal probability may correspond to a probability of the second client device presenting the threshold amount (e.g., a threshold duration of 5 minutes, a threshold proportion of 50% of the first content item, etc.) of the second content item responsive to presenting the second content item via the second client device. Alternatively and/or additionally, the positive signal may be indicative of an entirety of the second content item being presented via the second client device and/or the first positive signal probability may correspond to a probability of the second client device presenting the entirety of the second content item responsive to presenting the second content item via the second client device. Alternatively and/or additionally, the positive signal may be indicative of one or more user interactions with the second content item and/or the first positive signal probability may correspond to a probability of the one or more user interactions occurring responsive to presenting the second content item via the second client device.

In some examples, the first positive signal probability is determined based upon a plurality of vector representations (at least some of which may be sparse vector representations) and/or a plurality of weights of the first machine learning model. The plurality of vector representations may comprise the one or more first sparse vector representations associated with the third set of features and/or one or more second sparse vector representations associated with a fourth set of features corresponding to second content item-related information associated with the second content item and/or a second entity associated with the second content item. The fourth set of features may comprise at least one of an identification of the second entity, a type of content of the second content item (e.g., video, image, audio, etc.), one or more characteristics of the second content item (e.g., size, duration, etc.), a type of product and/or service that the second content item promotes (e.g., shoes, cars, etc.), a brand associated with the second content item (e.g., a brand of a product and/or service that the second content item promotes), one or more words and/or unique words comprised in the second content item, one or more topics of the second content item, one or more identifications of subject matter of the second content item, an author of the second content item, a publisher of the second content item, a producer of the second content item, one or more artists associated with the second content item, one or more actors associated with the second content item, etc. The plurality of weights may comprise one or more first weights associated with the third set of features and/or one or more second weights associated with the fourth set of features.

At 820, the second content item may be selected from the plurality of content items for presentation via the second client device based upon the plurality of positive signal probabilities. For example, the second content item may be selected for presentation via the second client device based upon a determination that the first positive signal probability is a highest positive signal probability of the plurality of positive signal probabilities. Alternatively and/or additionally, the plurality of content items may be ranked based upon the plurality of positive signal probabilities and/or one or more other parameters. The second content item may be selected for presentation via the second client device based upon a determination that the second content item is ranked higher than other content items of the plurality of content items (and/or based upon a determination that the second content item is ranked highest among the plurality of content items).

At 822, the second content item may be transmitted to the second client device. The second content item may be presented via the second client device, such as on the second internet resource.

Implementation of at least some of the disclosed subject matter may lead to benefits including, but not limited to, reduced space-complexity of a machine learning model and/or feature information (e.g., vector representations and/or weights associated with features) such that the machine learning model and/or the feature information require less memory for storage.

Alternatively and/or additionally, implementation of the disclosed subject matter may lead to benefits including faster storage times of the machine learning model and/or the feature information onto servers (e.g., as a result of the reduced space-complexity). Accordingly, machine learning models may be updated and/or loaded onto a server more quickly. Thus an updated machine learning model may be available for determining positive signal probabilities more quickly, thereby reducing delay that may be introduced into the system as a result of loading the updated machine learning model onto the server and/or thereby enabling the system to start using the updated machine learning model to determine positive signal probabilities at an earlier time.

Alternatively and/or additionally, implementation of the disclosed subject matter may lead to benefits including improved performance of a computer configured to determine positive signal probabilities and/or faster determinations of positive signal probabilities (e.g., as a result of providing for a reduced amount of computations, such as floating point computations, needed for determining positive signal probabilities).

Alternatively and/or additionally, implementation of the disclosed subject matter may lead to benefits including more accurate determinations of positive signal probabilities (e.g., as a result of the machine learning model including information associated with a greater amount of relevant features while still meeting any storage requirements and/or memory limitations).

Alternatively and/or additionally, implementation of the disclosed subject matter may lead to benefits including more accurate selections of content (e.g., as a result of the more accurate determinations of positive signal probabilities, as a result of the faster determinations of positive signal probabilities such that a greater amount of positive signal probabilities associated with a greater amount of content items can be determined in a time window within which content may need to be selected for presentation via a client device, and thus, a more accurate selection of content can be made within the time window, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 9:
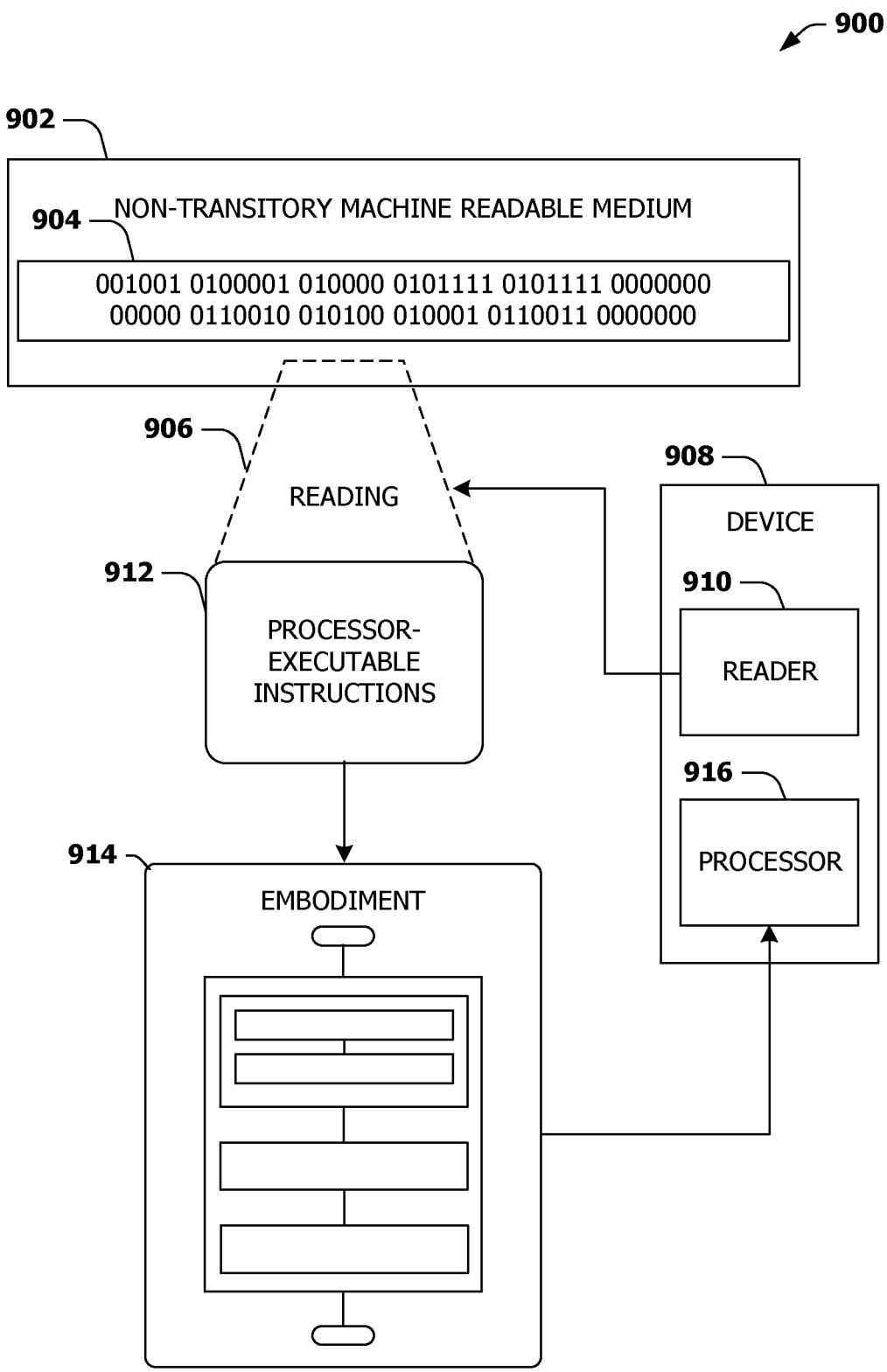
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein (e.g., embodiment 914). The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed, cause performance of operations, such as at least some of the example method 400 of FIGS. 4A-4B and/or the example method 800 of FIGS. 8A-8B, for example. In some embodiments, the processor-executable instructions 912 are configured to cause implementation of a system, such as at least some of the example system 601 of FIGS. 6A-6G and/or the example system 701 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a first bid request, wherein:
the first bid request is associated with a first request for content associated with a first client device; and
the first bid request is indicative of a first set of features comprising one or more first features associated with the first request for content;
submitting a first bid value associated with a first content item to a first auction module for participation in a first auction associated with the first request for content;
storing, in an auction information database, a first set of auction information associated with the first auction, wherein:
the first set of auction information is indicative of the first set of features; and
the auction information database comprises a plurality of sets of auction information, comprising the first set of auction information, associated with a plurality of auctions comprising the first auction;
training a machine learning model using the plurality of sets of auction information, wherein the training the machine learning model comprises generating a second machine learning model with a first plurality of vector representations, wherein a vector representation of the first plurality of vector representations comprises a plurality of feature parameters;
performing one or more pruning operations, in association with the training, to generate a first machine learning model with sparse vector representations associated with features of the plurality of sets of auction information, wherein the one or more pruning operations are performed by setting a first plurality of feature parameters of the first plurality of vector representations to zero;
receiving a second bid request, wherein:
the second bid request is associated with a second request for content associated with a second client device; and
the second bid request is indicative of a second set of features comprising one or more second features associated with the second request for content, wherein the second set of features comprises a time associated with the second request for content;
determining, using the first machine learning model, a plurality of click probabilities associated with a plurality of content items based upon one or more first sparse vector representations, of the first machine learning model, associated with the second set of features, wherein a first click probability of the plurality of click probabilities is associated with a second content item of the plurality of content items and corresponds to a probability of receiving a selection of the second content item responsive to presenting the second content item via the second client device;
selecting, from the plurality of content items, the second content item for presentation via the second client device based upon the plurality of click probabilities; and
submitting a second bid value associated with the second content item to a second auction module for participation in a second auction associated with the second request for content.

2. The method of claim 1, wherein:
the one or more pruning operations are performed in an iterative pruning process.

3. The method of claim 1, wherein:
the first set of features comprises at least one of a domain name of an internet resource associated with the first request for content or a top-level domain associated with the internet resource.

4. The method of claim 1, wherein:
the second set of features comprises a device identifier associated with the second client device.

5. The method of claim 2, wherein:
the training the machine learning model comprises performing one or more first training steps to generate a first plurality of weights associated with connections between deep neural network nodes;
the performing the one or more pruning operations comprises performing a first iteration of the iterative pruning process by setting a first subset of weights, of the first plurality of weights, to zero to generate a second plurality of weights having a first sparsity;

the training the machine learning model comprises performing one or more second training steps, using the second plurality of weights, to generate a third plurality of weights; and the performing the one or more pruning operations comprises performing a second iteration of the iterative pruning process by setting a second subset of weights, of the third plurality of weights, to zero to generate a fourth plurality of weights having a second sparsity.

6. The method of claim 1, wherein:
the second set of features comprises an internet resource associated with the second request for content.

7. The method of claim 5, wherein:
the setting the first subset of weights to zero is performed based upon a determination that weights of the first subset of weights are lowest weights of the first plurality of weights; and
the setting the second subset of weights to zero is performed based upon a determination that weights of the second subset of weights are lowest weights of the third plurality of weights.

8. The method of claim 1, wherein:
the first set of features comprises an internet resource associated with the first request for content.

9. The method of claim 1, wherein:
the first set of features comprises at least some of a web address of an internet resource associated with the first request for content.

10. The method of claim 1, comprising:
determining the second bid value based upon the first click probability.

11. The method of claim 1, comprising:
receiving a click indication indicative of a selection of the first content item via the first client device, wherein the first set of auction information comprises the click indication.

12. A computing device comprising:
a processor; and
memory comprising processor-executable instructions that when executed by the processor cause performance of operations, the operations comprising:
receiving a first request for content associated with a first client device;
determining, based upon the first request for content, a first set of features associated with the first request for content;
selecting a first content item for presentation via the first client device;
storing, in an information database, a first set of information associated with the first request for content, wherein:
the first set of information is indicative of the first set of features; and
the information database comprises a plurality of sets of information, comprising the first set of information, associated with a plurality of requests for content comprising the first request for content;
training a machine learning model using the plurality of sets of information, wherein the training the machine learning model comprises performing one or more first training steps to generate a first plurality of weights associated with connections between deep neural network nodes;
performing one or more pruning operations in association with the training to generate a first machine learning model with sparse vector representations associated with features of the plurality of sets of information, wherein:
the one or more pruning operations are performed in an iterative pruning process;
the performing the one or more pruning operations comprises performing a first iteration of the iterative pruning process by setting a first subset of weights, of the first plurality of weights, to zero to generate a second plurality of weights having a first sparsity;
the training the machine learning model comprises performing one or more second training steps, using the second plurality of weights, to generate a third plurality of weights; and
the performing the one or more pruning operations comprises performing a second iteration of the iterative pruning process by setting a second subset of weights, of the third plurality of weights, to zero to generate a fourth plurality of weights having a second sparsity;
receiving a second request for content associated with a second client device;
determining, based upon the second request for content, a second set of features associated with the second request for content;
determining, using the first machine learning model, a plurality of positive signal probabilities associated with a plurality of content items based upon one or more first sparse vector representations, of the first machine learning model, associated with the second set of features, wherein a first positive signal probability of the plurality of positive signal probabilities is associated with a second content item of the plurality of content items and corresponds to a probability of receiving a positive signal responsive to presenting the second content item via the second client device;
selecting, from the plurality of content items, the second content item for presentation via the second client device based upon the plurality of positive signal probabilities; and
transmitting the second content item to the second client device.

13. The computing device of claim 12, wherein:
the first set of features comprises at least some of a web address of an internet resource associated with the first request for content.

14. The computing device of claim 12, wherein:
the first set of features comprises at least one of a domain name of an internet resource associated with the first request for content or a top-level domain associated with the internet resource.

15. The computing device of claim 12, wherein:
the second set of features comprises a location associated with the second client device.

16. The computing device of claim 12, wherein:
the first set of features comprises an internet resource associated with the first request for content.

17. The computing device of claim 12, wherein:
the second set of features comprises a device identifier associated with the second client device.

18. The computing device of claim 16, wherein:
the setting the first subset of weights to zero is performed based upon a determination that weights of the first subset of weights are lowest weights of the first plurality of weights; and the setting the second subset of weights to zero is performed based upon a determination that weights of the second subset of weights are lowest weights of the third plurality of weights.

19. The computing device of claim 12, wherein:
the second set of features comprises a time associated with the second request for content.

20. A non-transitory machine readable medium having stored thereon processor-executable instructions that when executed cause performance of operations, the operations comprising:
receiving a first bid request, wherein:
the first bid request is associated with a first request for content associated with a first client device; and
the first bid request is indicative of a first set of features comprising one or more first features associated with the first request for content;
submitting a first bid value associated with a first content item to a first auction module for participation in a first auction associated with the first request for content;
storing, in an auction information database, a first set of auction information associated with the first auction, wherein:
the first set of auction information is indicative of the first set of features; and
the auction information database comprises a plurality of sets of auction information, comprising the first set of auction information, associated with a plurality of auctions comprising the first auction;
training a machine learning model using the plurality of sets of auction information, wherein the training the machine learning model comprises performing one or more first training steps to generate a first plurality of weights associated with connections between deep neural network nodes;
performing one or more pruning operations, in association with the training, to generate a first machine learning model with sparse vector representations associated with features of the plurality of sets of auction information, wherein:
the one or more pruning operations are performed in an iterative pruning process;
the performing the one or more pruning operations comprises performing a first iteration of the iterative pruning process by setting a first subset of weights, of the first plurality of weights, to zero to generate a second plurality of weights having a first sparsity;
the training the machine learning model comprises performing one or more second training steps, using the second plurality of weights, to generate a third plurality of weights; and
the performing the one or more pruning operations comprises performing a second iteration of the iterative pruning process by setting a second subset of weights, of the third plurality of weights, to zero to generate a fourth plurality of weights having a second sparsity;
receiving a second bid request, wherein:
the second bid request is associated with a second request for content associated with a second client device; and
the second bid request is indicative of a second set of features comprising one or more second features associated with the second request for content;
determining, using the first machine learning model, a plurality of click probabilities associated with a plurality of content items based upon one or more first sparse vector representations, of the first machine learning model, associated with the second set of features, wherein a first click probability of the plurality of click probabilities is associated with a second content item of the plurality of content items and corresponds to a probability of receiving a selection of the second content item responsive to presenting the second content item via the second client device;
selecting, from the plurality of content items, the second content item for presentation via the second client device based upon the plurality of click probabilities; and
submitting a second bid value associated with the second content item to a second auction module for participation in a second auction associated with the second request for content.

* * * * *